(12) United States Patent
Luster et al.

(10) Patent No.: US 8,794,897 B2
(45) Date of Patent: Aug. 5, 2014

(54) BIN SWEEP

(75) Inventors: Jason Luster, Huxley, IA (US); Todd Maxwell Hall, Sheffield, IA (US); Daniel Sease, Ankeny, IA (US); Christopher Ryan King, Des Moines, IA (US); Derek Jay Hemphill, Ankeny, IA (US)

(73) Assignee: CTB Midwest, Inc., Milford, IN (US)

( * ) Notice: Subject to any disclaimer, the term of this patent is extended or adjusted under 35 U.S.C. 154(b) by 310 days.

(21) Appl. No.: 13/400,496

(22) Filed: Feb. 20, 2012

(65) Prior Publication Data

US 2013/0216341 A1 Aug. 22, 2013

(51) Int. Cl.
*B65G 65/00* (2006.01)

(52) U.S. Cl.
USPC .......................................... 414/310; 198/667

(58) Field of Classification Search
CPC ...... B65G 65/466; B65G 33/32; B65G 33/00; B65G 33/265; A01F 25/2018; A01D 90/105; F23K 3/14
USPC .......... 198/666, 667, 668, 571; 414/307, 310, 414/323
See application file for complete search history.

(56) References Cited

U.S. PATENT DOCUMENTS

| | | | |
|---|---|---|---|
| 1,274,548 A | 8/1918 | Holnagel et al. | |
| 2,500,043 A | 3/1950 | Radtke | |
| 2,790,563 A * | 4/1957 | McCarthy | 414/312 |
| 3,129,828 A | 4/1964 | Lusk | |
| 4,083,462 A * | 4/1978 | Teske et al. | 414/307 |
| 4,095,703 A * | 6/1978 | Weaver | 414/307 |
| 4,099,633 A * | 7/1978 | Cantenot | 414/309 |
| 4,103,788 A | 8/1978 | Sutton | |
| 5,098,247 A | 3/1992 | Campbell | |
| 5,180,272 A | 1/1993 | Campbell | |
| 5,366,067 A | 11/1994 | Courtois et al. | |
| 5,449,263 A | 9/1995 | Campbell et al. | |
| 5,944,168 A | 8/1999 | Campbell et al. | |
| 7,735,697 B2 * | 6/2010 | Nordstrom | 222/410 |
| 2005/0263372 A1 * | 12/2005 | Hollander et al. | 198/550.1 |
| 2006/0245864 A1 * | 11/2006 | Epp et al. | 414/310 |
| 2013/0216341 A1 * | 8/2013 | Luster et al. | 414/326 |

FOREIGN PATENT DOCUMENTS

FR 2693710 A1 1/1994

OTHER PUBLICATIONS

An Introduction to Pneumatics for High School Students http://www.fpet.org/teacher_resources/Curriculum2/IntroductionCurriculum2.htm.

* cited by examiner

*Primary Examiner* — Saul Rodriguez
*Assistant Examiner* — Emery Hassan
(74) *Attorney, Agent, or Firm* — Camille L. Urban; David M. Breiner

(57) ABSTRACT

In accordance with example embodiments, a sweep may include a pivot assembly, a first arm extending from the pivot assembly, a second arm extending from the pivot assembly, a first driving mechanism attached to the first arm, a second driving mechanism attached to the second arm, and a control device configured to control the first driving mechanism and the second driving mechanism. In example embodiments, the control device may be configured to control the first and second driving mechanism based on a detected variable.

20 Claims, 40 Drawing Sheets

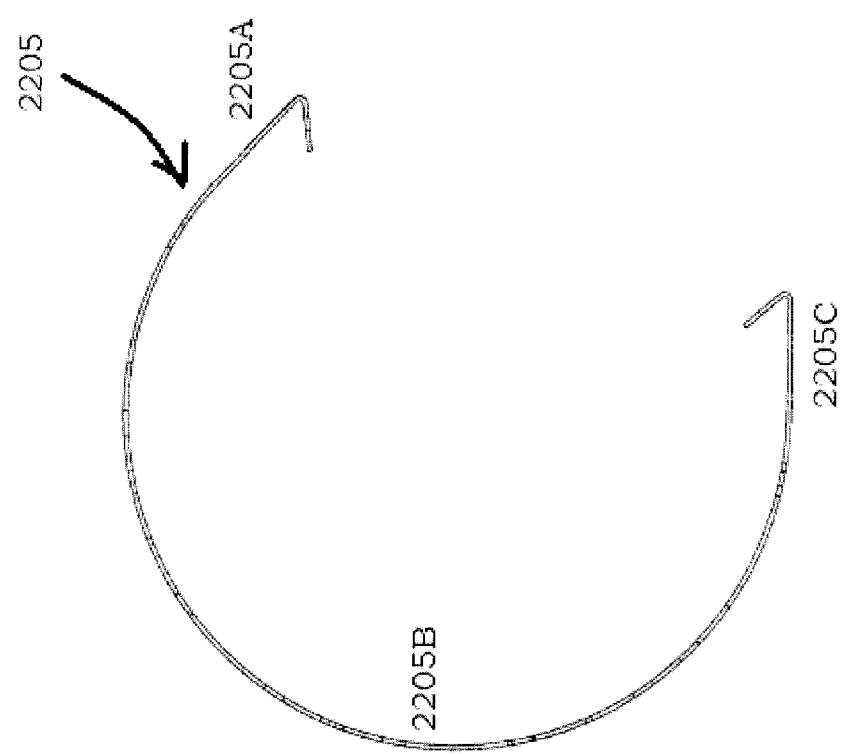

BIN SWEEP

BACKGROUND

1. Field

Example embodiments relate to a bin sweep and in particular to a bin sweep configured to sweep grain in a grain bin.

2. Description of the Related Art

FIG. 1 is a view of a conventional grain bin 10. In general, conventional grain bins are column shaped structures having a floor 15 upon which grain 20 is stored. Underneath the floor 15 are grain conveying devices 25, such as augers or belts, which are used to remove the grain from the grain bin 10. An opening in the floor 30, generally referred to as a sump, may be provided to pass the grain 20 from the floor 15 to the grain conveying devices 25.

Some conventional grain bins are fitted with a bin sweep to facilitate transfer of grain from a floor of a grain bin to conveying devices that may be under the floor. For example, FIG. 2 is a view of a conventional grain bin 50 having a floor 60 and grain conveying devices 80 under the floor 60. As in the previous example, the floor 60 of the conventional grain bin 50 may include a sump 75. In FIG. 2, however, a conventional bin sweep 55 is installed on the floor 60. The conventional bin sweep 50 generally includes a single auger 65 attached to a driving mechanism 70. The driving mechanism 70 may cause the auger 65 to rotate thereby causing grain to move towards the sump 75. In the conventional art, the driving mechanism 70 may also cause the auger 65 to move around the grain bin 50 in a circular path C. Thus, as the auger 55 turns and moves in a circular path C, grain on the floor 60 of the grain bin 50 may be moved to a sump 75 where the grain travels to the grain conveying devices 80 for removal from the grain bin 50.

SUMMARY

Example embodiments relate to a bin sweep and in particular to a bin sweep configured to sweep grain in a grain bin.

In accordance with example embodiments, a sweep may include a pivot assembly, a first arm extending from the pivot assembly, a second arm extending from the pivot assembly, a first driving mechanism attached to the first arm, a second driving mechanism attached to the second arm, and a control device configured to control the first driving mechanism and the second driving mechanism. In example embodiments, the control device is configured to control the first driving mechanism to travel in a first direction when a variable is in a first range and to stop when the variable is in a second range. In example embodiments, the control device may be further configured to control the second driving mechanism to travel in a second direction when the variable is in the first range and stop when the variable is in the second range.

In accordance with example embodiments, a bearing housing may include a substantially annular member having a gap formed at one side thereof. In example embodiments the substantially annular member may include at least one hole passing through the gap, wherein a portion of the hole on one side of the gap includes internal threads and a portion of the hole on another side of the gap includes a shoulder.

In accordance with example embodiments, a connection assembly may include a connection plate, a first wheel connected to the connection plate by a pair of sweep plates, and a second wheel connected to the connection plate by a pair of linkages and a biasing member.

In accordance with example embodiments, a stiffening system may include a plurality of transverse stiffeners and a plurality of longitudinal stiffeners. In example embodiments the plurality of transverse stiffeners may include a first plurality of slots and the plurality of longitudinal stiffeners may include a second plurality of slots, wherein the first plurality of slots and the second plurality of slots are configured to engage one another.

In accordance with example embodiments, a sweep section may include an outer shell, a plurality of transverse stiffeners arranged along a length of the outer shell, and a plurality of longitudinal stiffeners extending along a length of the outer shell. In example embodiments the plurality of transverse stiffeners may include a first plurality of slots which engage the plurality of longitudinal stiffeners and the plurality of longitudinal stiffeners may include a second plurality of slots which engage the plurality of transverse stiffeners.

In accordance with example embodiments a connection assembly may include a first plate including a first hole and a second plate including a second hole and a third hole. In example embodiments the second hole may be aligned with the first hole and the third hole may be offset from the second hole. In example embodiments a surface of the second plate facing the first plate may include a recessed area corresponding to the third hole and the first plate may cover the recessed area.

In accordance with example embodiments, an end assembly may include a mating member, a first extension member connected to the mating member, and a second extension member extending from the first extension member. In example embodiments the first extension member may include a first plurality of holes and the second extension member may include a second plurality of holes having the same pattern as the first plurality of holes.

BRIEF DESCRIPTION OF THE DRAWINGS

Example embodiments are described in detail below with reference to the attached drawing figures, wherein.

DETAILED DESCRIPTION

Figure 1:
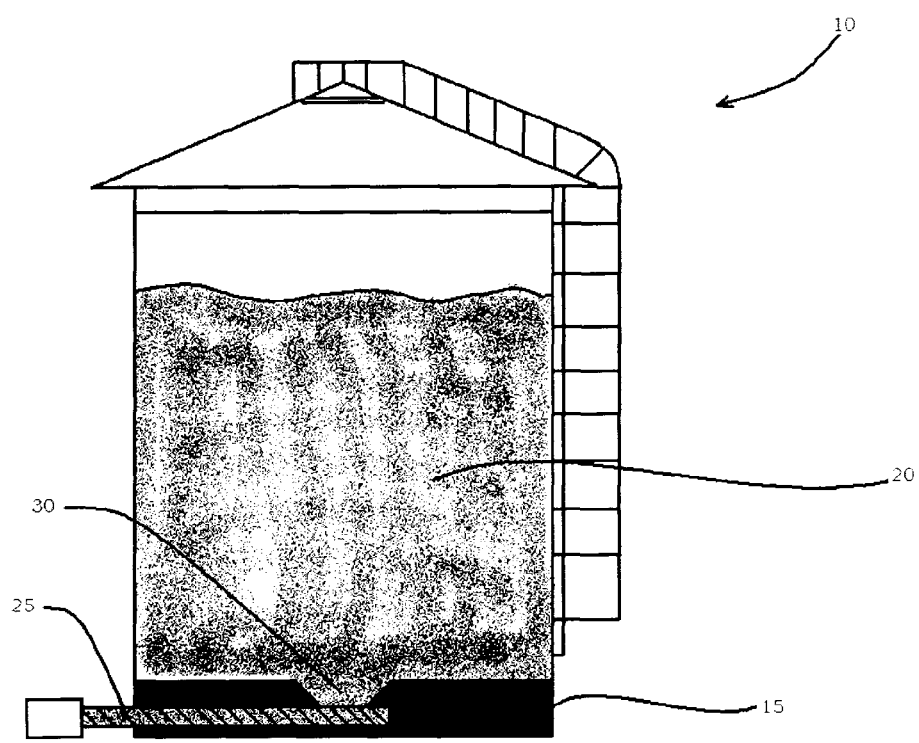
FIG. 1 is a view of a conventional grain bin.
Figure 2:
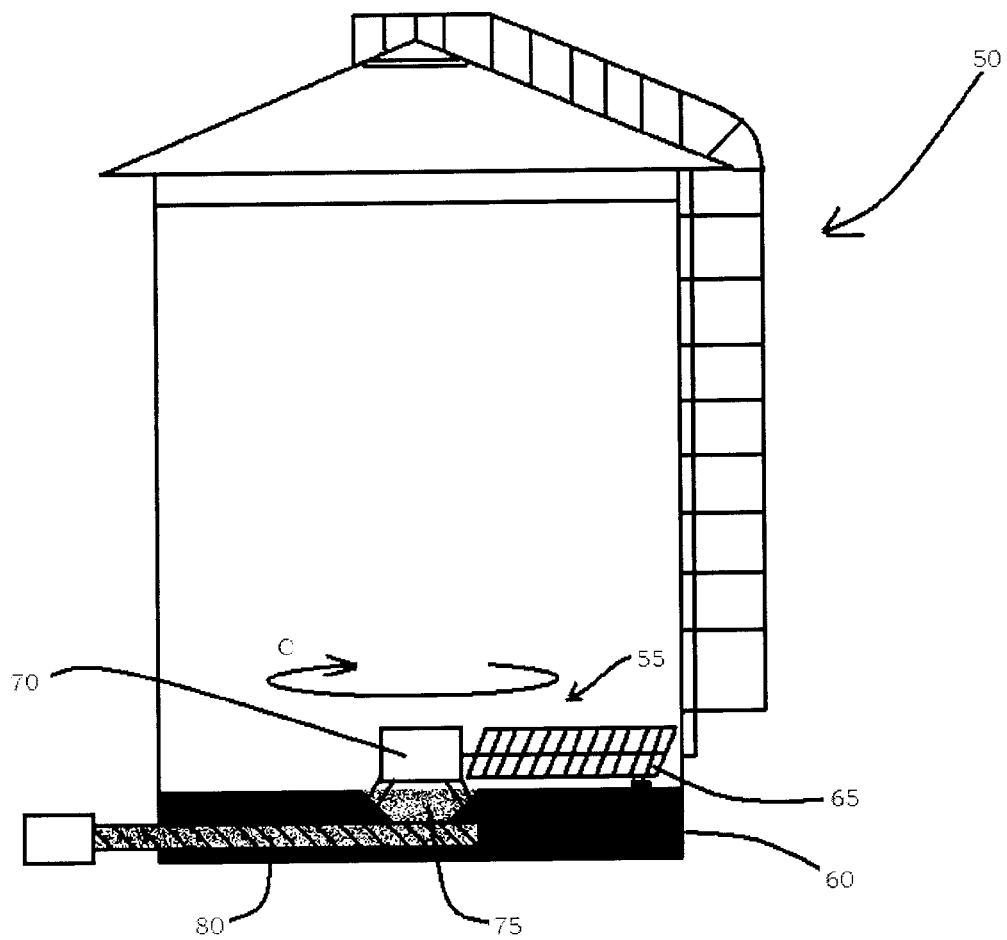
FIG. 2 is a view of the conventional grain bin including a conventional grain bin sweep.

Example embodiments will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments of the invention relate to a bin sweep and in particular to a bin sweep configured to sweep a grain bin.

Figure 3:
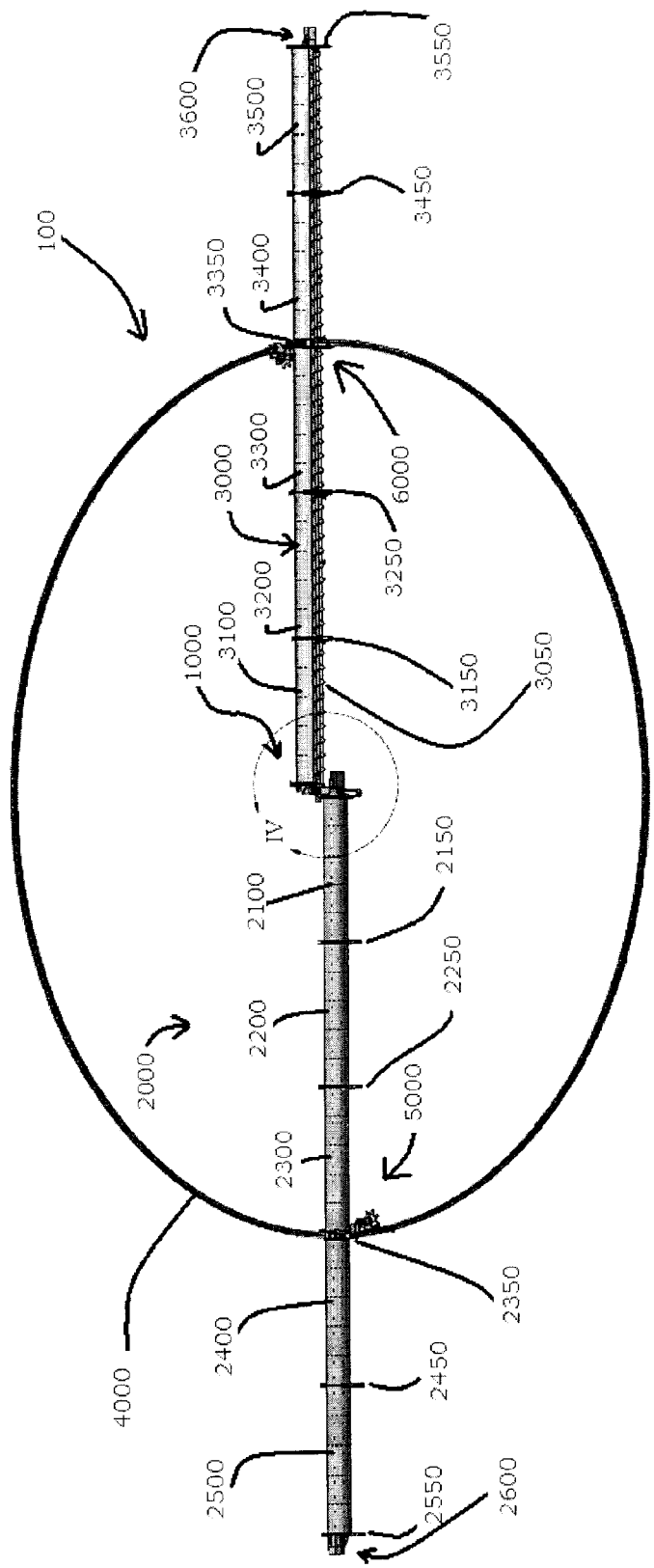
FIG. 3 is a view of the bin sweep in accordance with example embodiments.

FIG. 3 is a view of a bin sweep 100 according to example embodiments. As shown in FIG. 3, the bin sweep 100 may include of a sweep pivot assembly 1000 with a first arm 2000 and a second arm 3000 extending therefrom. In example embodiments, each of the first arm 2000 and the second arm 3000 may house at least one material transfer device, for example, an auger or a conveyer belt, configured to move a material, for example, grain, sand, or coal, towards the sweep pivot assembly 1000. In example embodiments, the material transfer devices may be connected to motors, for example, hydraulic motors, to drive the material transfer devices to cause the material, for example, grain, sand, or coal, to move towards the sweep pivot assembly 1000. In example embodiments, the sweep pivot assembly 1000 may be arranged over a sump of a bin. Thus, as the material transfer devices operate, material may be moved towards the sump.

In example embodiments, the bin sweep 100 may further include a track 4000 which may substantially surround the sweep pivot assembly 1000. The track 4000 may interface with a first driving mechanism 5000 and a second driving mechanism 6000 which may respectively be connected to the first arm 2000 and the second arm 3000. In example embodiments, the first and second driving mechanisms 5000 and 6000 may move along the track 4000. Thus, the first and second driving mechanisms 5000 and 6000 may cause the first arm 2000 and the second arm 3000 to revolve around a point associated with the sweep pivot assembly 1000 (for example, the sweep swivel 1200 illustrated in FIGS. 4 and 5). In example embodiments, the material moving devices in the first and second arms 2000 and 3000 and the first and second driving mechanisms 5000 and 6000 may operate at the same time. Thus, as the first and second arms 2000 and 3000 revolve around the point associated with the sweep pivot assembly 1000, material, for example, grain, sand, or coal, may be moved towards the sweep pivot assembly 1000.

In example embodiments, the first and second driving mechanisms 5000 and 6000 may be configured to move the first and second arms 2000 and 3000 at about the same speed and at about the same direction. For example, in the event the first driving mechanism 5000 is moving in a direction that causes the first arm 2000 to move clockwise about the point associated with the sweep pivot assembly 1000, the second driving mechanism 6000 would move in a direction that would cause the second arm 3000 to move clockwise about the point associated with the sweep pivot assembly 1000. Example embodiments, however, are not limited thereto as the first and second driving mechanisms 5000 and 6000 may be configured to move at different speeds and may be configured to move the first arm 2000 and the second arm 3000 in different directions.

Figure 4:
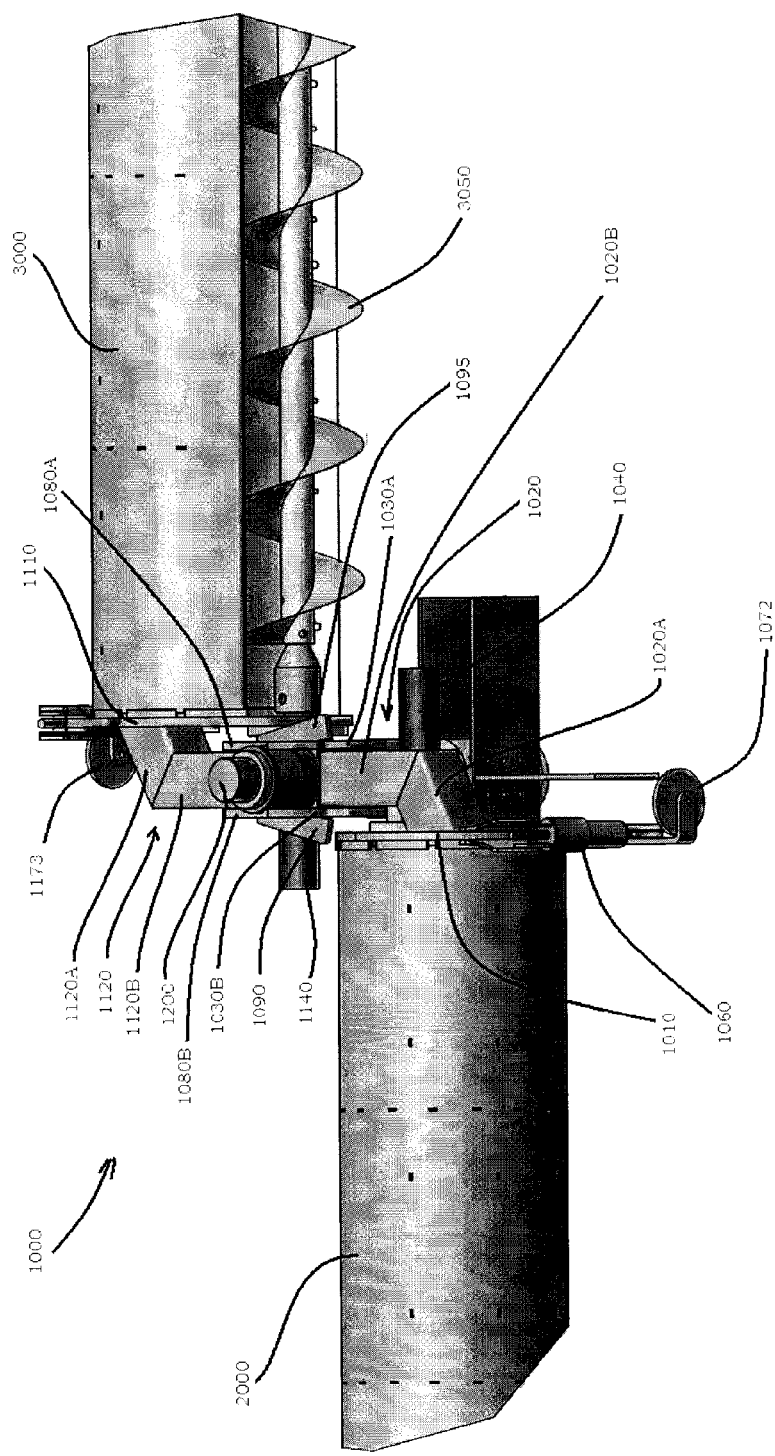
FIG. 4 is a close-up view of the bin sweep in accordance with example embodiments.
Figure 5:
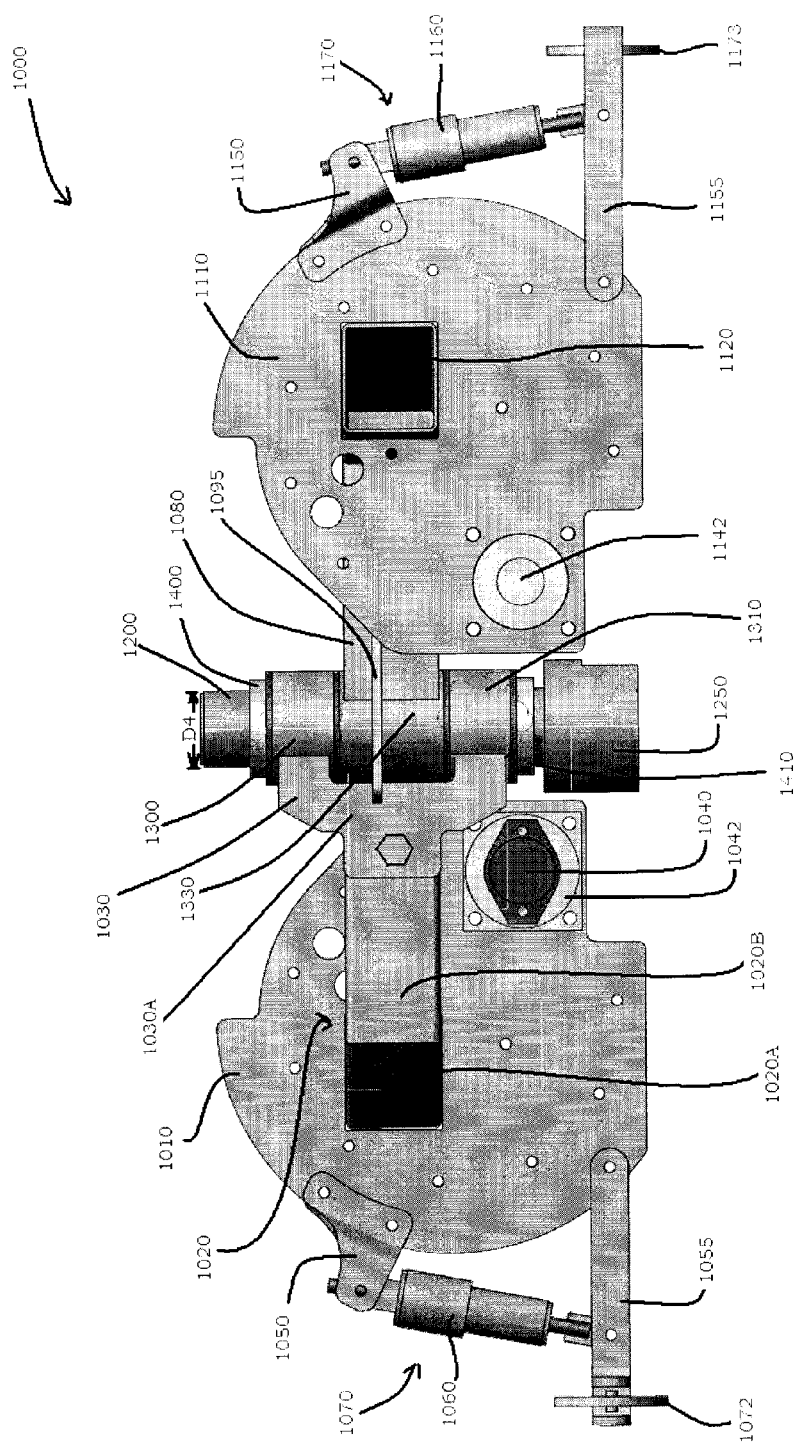
FIG. 5 is a side view of the sweep pivot assembly in accordance with example embodiments.

FIGS. 4 and 5 are, respectively, a close-up view and a side view of the sweep pivot assembly 1000. It should be pointed out that the sweep pivot assembly 1000 illustrated in FIGS. 4 and 5 is merely exemplary and is in no way intended to limit the invention. As shown in FIGS. 4 and 5, the example sweep pivot assembly 1000 may include a sweep swivel 1200 about which various members of the sweep pivot assembly 1000 rotate, a first connecting member 1010 configured to allow the first arm 2000 to connect to the sweep pivot assembly 1000, a second connecting member 1110 to allow the second arm 3000 to connect to the sweep pivot assembly 1000, a third connecting member 1020 configured to connect the first connecting member 1010 to the sweep swivel 1200, and a fourth connecting member 1120 configured to connect the second connecting member 1110 to the sweep swivel 1200. In example embodiments, the sweep swivel 1200 may be a substantially column shaped member having a substantially circular cross-section.

As indicated above, the sweep pivot assembly 1000 may include a first connecting member 1010 and a second connecting member 1110 to allow the first arm 2000 and the second arm 3000 to connect to the sweep pivot assembly 1000. For example, the first and second connecting members 1010 and 1110 may be substantially plate shaped members with holes formed therein to allow the first and second connecting members 1010 and 1110 to connect to the first and second arms 2000 and 3000 by bolting. Example embodiments, however, are not limited thereto. For example, rather than bolting the first and second arms 2000 and 3000 to the first and second connecting members 1010 and 1110, the first and second arms 2000 and 3000 may be pinned, welded, riveted, and/or clamped to the first and second connecting members 1010 and 1110. Furthermore, the first and second connecting members 1010 and 1110 are not limited to merely having a plate shape. For example, the first and second connecting members 1010 and 1110 may resemble angle iron, channel iron, or tube steel.

As shown in FIGS. 4 and 5, an alluded to above, the first connecting member 1010 may be connected to a sweep swivel 1200 by a third connecting member 1020 and the second connecting member 1110 may be connected to the sweep swivel 1200 by a fourth connecting member 1120. In example embodiments, the third and fourth connecting members 1020 and 1120 may be formed from tube steel. For example, as shown in FIG. 4, the third connecting member 1020 may be comprised of a first member 1020A and a second member 1020B, each of which may be formed from tube steel. In the non-limiting example illustrated in FIG. 4, the first and second members 1020A and 1020B may be welded together to form one continuous member. Likewise, the fourth connecting member 1120 may be comprised of a third member 1120A and a fourth member 1120B, each of which may be formed from tube steel. In the non-limiting example illustrated in FIG. 4, the third and fourth members 1120A and 1120B may be welded together to form one continuous member. Example embodiments, however, are not limited by the above configuration. For example, rather than forming the third connecting member 1020 by welding together the first member 1020A and the second member 1020B, the third connecting member 1020 may simply be comprised of a single bent or curved tube steel member or even a straight tube steel member. Likewise, rather than forming the fourth connecting member 1120 by welding together the third member 1120A and the fourth member 1120B, the fourth connecting member 1120 may simply be comprised of a single bent or curved tube steel member or even a straight tube steel member. In addition, the third and fourth connecting members 1020 and 1120 need not be comprised of tube steel. For example, structural members having anyone of an L, C, I, T, or H cross-section may be used to form the third and fourth connecting members 1020 and 1120. Further yet, the third and fourth connecting members 1020 and 1120 may be formed of tube steel members having a circular, elliptical, or polygonal (for example, triangular, pentagonal, or octagonal) cross-section. Further yet, the third and fourth connecting members 1020 and 1120 may be formed from members having a solid cross-section. In addition, although the aforementioned components have been described as being constructed from steel and iron, the invention is not limited thereto as the components may be made from other materials, such as aluminum, plastic, and/or a composite material.

In example embodiments, the first connecting member 1010 may be connected to the third connecting member 1020 by welding and the second connecting member 1110 and the fourth connecting member 1120 may likewise be connected to each other by welding. Example embodiments, however, are not limited thereto. For example, the first connecting member 1010 may be formed with a protrusion into which the third connecting member 1020 may be inserted. In this configuration, the first connecting member 1010 and the third connecting member 1020 may be attached to one another by bolting, pinning, or riveting. Likewise, the second connecting member 1110 may be formed with a protrusion into which the fourth connecting member 1120 may be inserted. In this configuration, the second connecting member 1110 and the fourth connecting member 1120 may be attached to one another by bolting, pinning, or riveting.

Figure 7:
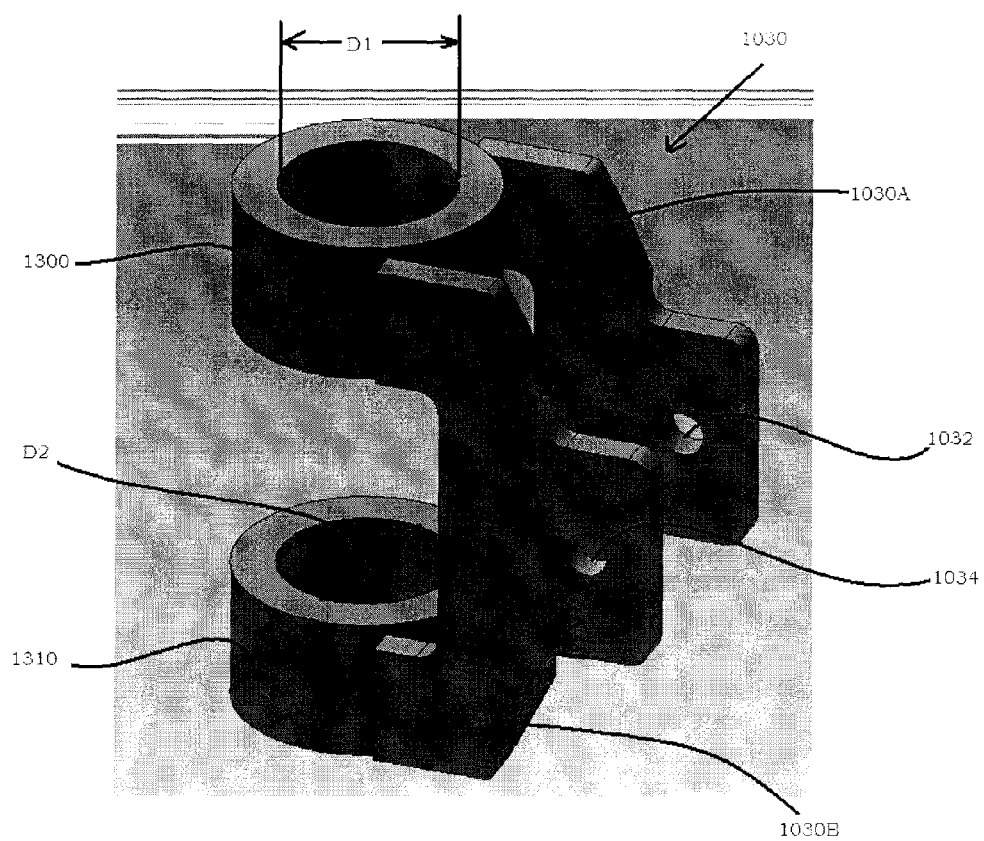
FIG. 7 is a view of a swivel collar in accordance with example embodiments.

In example embodiments, the third connecting member 1020 may be connected to the sweep swivel 1200 by a swivel collar 1030. In example embodiments, the swivel collar 1030 may be configured to allow the third connecting member 1020 to rotate about the sweep swivel 1200. In addition, the swivel collar 1030 may be further configured to restrain one end of the third connecting member 1020 vertically while allowing another end of the third connecting member 1020 to move up and down. FIGS. 4, 5, and 7 provide a non-limiting example of the swivel collar 1030. Referring to FIGS. 4, 5, and 7, the example swivel collar 1030 may be comprised of a first plate 1030A, a second plate 1030B, a first bushing 1300, and a second bushing 1310. In example embodiments, the first plate 1030A and the second plate 1030B may be substantially parallel and may be spaced far enough apart so that inside surfaces of the first and second plate 1030A and 1030B face outside surfaces of the third connecting member 1020. In addition, the first bushing 1300 and the second bushing 1310 may be configured to fit over the sweep swivel 1200 to allow the swivel collar 1030 to rotate about the sweep swivel 1200. Thus, in example embodiments, inside diameters D1 and D2 of the first and second bushings 1300 and 1310 should be about the same as, or slightly larger than, an outside diameter D4 of the sweep swivel 1200.

Figure 6:
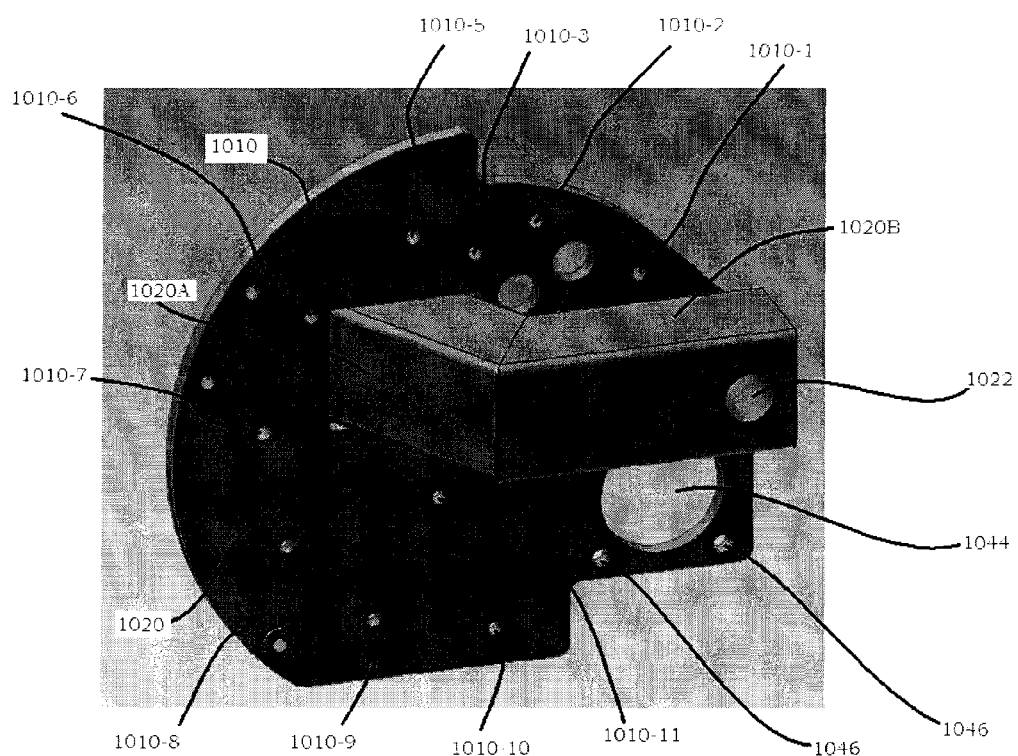
FIG. 6 is a view of a connecting member connecting to a connecting plate in accordance with example embodiments.

In example embodiments, the swivel collar 1030 may be connected to the third connecting member 1020 by bolting. For example, as illustrated in FIG. 6, the third connecting member 1020 may be formed to have a hole near one end thereof. The hole may be fitted with a bushing 1022 as shown in FIG. 6. In example embodiments, the bushing 1022 may be fixed to the third connecting member 1020. For example, the bushing 1022 may be welded to the third connecting member 1020. In the alternative, the bushing 1022 may be fixed to the third connecting member by using another connecting method. For example, the bushing 1022 and the holes at the end of the third connecting member may be formed as a lock and key which is well known in the conventional art. In example embodiments, the swivel collar 1030 may also be formed with holes 1032 and 1034 near an end thereof (see FIG. 7). When assembled, the holes 1032 and 1034 of the swivel collar 1030 may be aligned with the bushing 1022 provided in the third connecting member 1020 and a bolt may inserted through the holes 1032 and 1034 of the swivel collar 1030 and the bushing 1022 of the third connecting member 1020 to connect the swivel collar 1030 to the third connecting member 1020.

Figure 8:
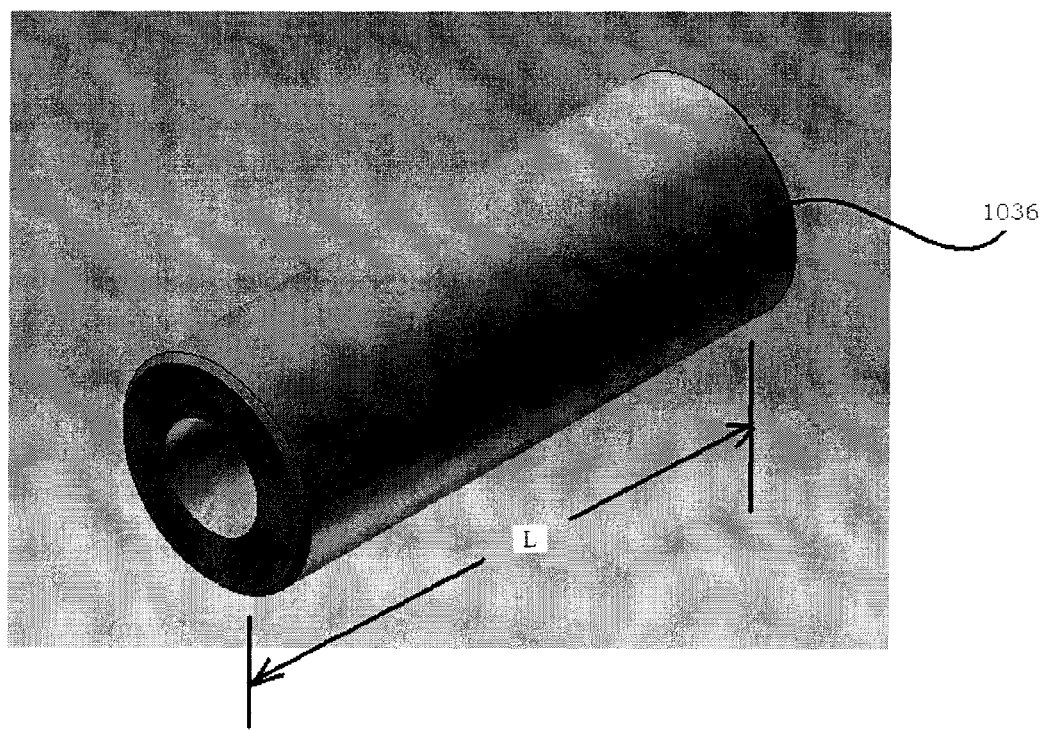
FIG. 8 is a view of an optional bushing in accordance with example embodiments.

In example embodiments, an optional bushing 1036, as illustrated in FIG. 8, may be inserted into the bushing 1022 provided in the third connecting member 1020. The optional bushing 1036 may have a length L which is longer (for example, about 1/16 inch longer) than a corresponding length of the bushing 1022 provided in the third connecting member 1020. Insertion of the optional bushing 1022 would ensure the swivel collar 1030 could rotate freely with respect to the third connecting member 1020. When the optional bushing 1036 is used, a bolt may be used to connect the swivel collar 1030 to the third connecting member 1020 by passing the bolt through the holes 1032 and 1034 of the swivel collar 1030, the bushing 1022 of the third connecting member 1020, and the optional bushing 1036 which may have been inserted into the bushing 1022 of the third connecting member 1020.

Figure 9:
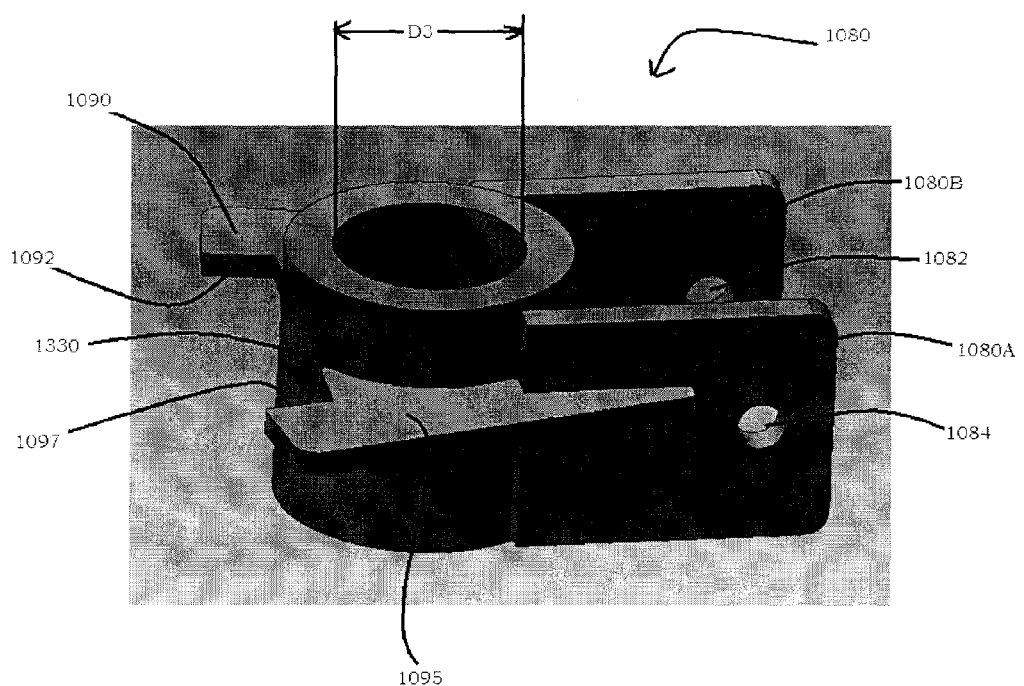
FIG. 9 is a view of a pivot collar in accordance with example embodiments.

In example embodiments, the fourth connecting member 1120 may be connected to the sweep swivel 1200 via a pivot collar 1080. The pivot collar 1080, for example, may be configured to allow the fourth connecting member 1120 to rotate about the sweep swivel 1200. In addition, the pivot collar 1080 may be configured to vertically restrain one end of the fourth connecting member 1120 while allowing another end of the fourth connecting member 1120 to move upwards or downwards. FIGS. 4, 5, and 9 provide a non-limiting example of a pivot collar 1080 in accordance with example embodiments. As shown in FIGS. 4, 5, and 9, the example pivot collar 1080 may be comprised of a first plate 1080A, second plate 1080B, and a third bushing 1330. In example embodiments, the first plate 1080A and the second plate 1080B may be substantially parallel and may be spaced far enough apart so that inside surfaces of the first and second plate 1080A and 1080B face outside surfaces of the fourth connecting member 1120. In addition, the third bushing 1330 may be configured to fit over the sweep swivel 1200 to allow the pivot collar 1080 to rotate about the sweep swivel 1200. Thus, the third bushing 1330 may have an inside diameter D3 which is substantially the same as, or slightly larger than, the diameter D4 of the sweep swivel 1200.

In example embodiments, the pivot collar 1080 may be connected to the fourth connecting member 1120 by bolting. For example, like the third connecting member 1020 illustrated in FIG. 6, the fourth connecting member 1120 may be formed to have a hole near one end thereof. The hole may be fitted with a bushing similar to the bushing 1022 as shown in FIG. 6. In example embodiments, the bushing fitted in the fourth connecting member 1120 may be fixed to the fourth connecting member 1120 by welding, however, welding is not a necessary feature of example embodiments. Similarly, the pivot collar 1080 may also be formed with holes 1082 and 1084 near an end thereof. When assembled, the holes 1082 and 1084 of the pivot collar 1080 may be aligned with the bushing provided in the fourth connecting member 1120 and a bolt may inserted through the holes 1082 and 1084 of the pivot collar 1080 and the bushing of the fourth connecting member 1120 to connect the pivot collar 1080 to the fourth connecting member 1120. In example embodiments, a second optional bushing similar to the optional bushing 1036 illustrated in FIG. 8 may be inserted into the bushing provided in the fourth connecting member 1120. The second optional bushing may have a length which is longer (for example, about 1/16 inch longer) than a corresponding length of the bushing provided in the fourth connecting member 1120. Insertion of the second optional bushing would ensure the pivot collar 1080 would rotate freely with respect to the fourth connecting member 1120.

In example embodiments, because the first connecting member 1010 and the second connecting member 1110 may be connected to the sweep swivel 1200 by different bushings, each of the first and second connecting members 1010 and 1110 may move independently of one another. For example, in example embodiments, the first arm 2000 may be able to rotate about the sweep swivel 1200 while the second arm 3000 remains stationary. In example embodiments, however, restraining structures may be provided to restrain the motion of one arm with respect to the other. For example, a pair of stops 1090 and 1095 resembling a pair of plates that may be welded to the pivot collar 1080 and the third bushing 1330. The pair of stops 1090 and 1095 may have ends that protrude over the swivel collar 1030 and therefore may have inner surfaces 1092 and 1097 that face, but do not necessarily contact, outer surfaces of the swivel collar 1030. Accordingly, the swivel collar 1030 may rotate slightly within the pair of stops 1090 and 1095. For example, the pair of stops 1090 and 1095 may allow the first arm 2000 to rotate about 10 to 20 degrees with respect to the second arm 3000 before an outer surface of the swivel collar 1030 collides with an inner surface of one of the pair of stops 1090 and 1095. Any further motion, however, would cause the second arm 3000 to rotate with the first arm 2000. It should be pointed out that the stops 1090 and 1095 may be configured to allow for rotation of one arm with respect to the other of greater than 20 degrees or less than 10 degrees.

In example embodiments, restraining structures may be placed on the sweep swivel 1200 in order to secure the first, second, and third bushings 1300, 1310, and 1330 in place. For example, in FIG. 5, a first split clamp 1400 may be provided above the first bushing 1300 and a second split clamp 1410 may be provided below the second bushing 1310 in order to secure the first, second, and third bushings 1300, 1310, and 1330 in place. Example embodiments, however, are not limited thereto. For example, rather than providing a first split clamp 1400 and a second split clamp 1410 to secure the first, second, and third bushings 1300, 1310, and 1330 in place, the sweep swivel 1200 may be tapped above and below the first and second bushings 1300 and 1310 and two pins may be inserted therein to secure the first, second, and third bushings 1300, 1310, and 1330 in place.

In example embodiments, the sweep pivot assembly 1000 may be partially supported by support assemblies. For example, as shown in FIGS. 4 and 5, a first support assembly 1070 may support one end of the sweep pivot assembly 1000 and a second support assembly 1170 may be provided to support a second end of the sweep pivot assembly 1000. FIGS. 4 and 5 provide non-limiting examples of the first support assembly 1070 and the second support assembly 1170. For example, as shown in FIG. 5, the first support 1070 assembly may include a first sweep wheel 1072 attached to the first connecting member 1010 by a first linkage 1055. The first linkage 1055 may in turn be connected to a first biasing member 1060, for example, a spring, which may, in turn, be connected to the first connecting member 1010 by a pair of sweep plates 1050. Similarly, a non-limiting example of the second support assembly 1170 may include a second sweep wheel 1173 which may be attached to the second connecting member 1110 by a second linkage 1155. The second linkage 1155 may, in turn, be connected to a second biasing member 1160, for example, a spring, which may, in turn, be connected to the second connecting member 1110 by a pair of sweep plates 1150. Although example embodiments are described as having the sweep pivot assembly 1000 being partially supported by a couple of support assemblies 1070 and 1170, example embodiments are not limited to the support assemblies 1070 and 1170 illustrated in the figures. For example, rather than providing sweep wheels, rollers (similar structures) may be employed. In addition, the assemblies including the linkages and springs are not meant to limit the invention as other structures serving the same purpose may be provided.

Figure 10:
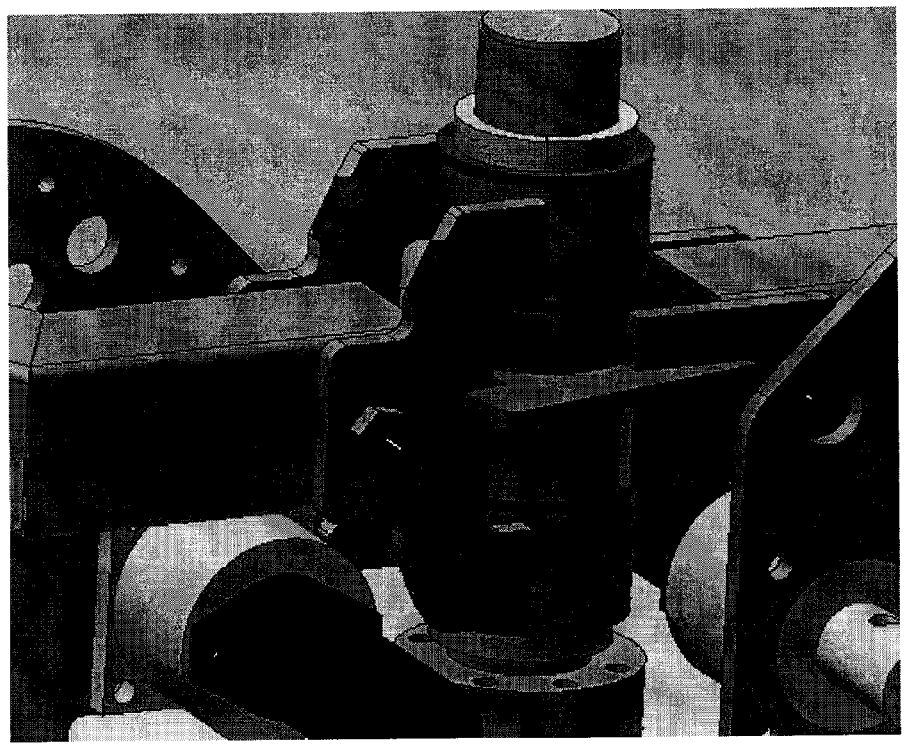
FIG. 10 is a view of the sweep pivot assembly in accordance with example embodiments.

FIG. 10 is a partial view of an assembled sweep pivot assembly 1000 showing a bolt connecting the swivel collar 1030 to the third connecting member 1020.

Figure 11:
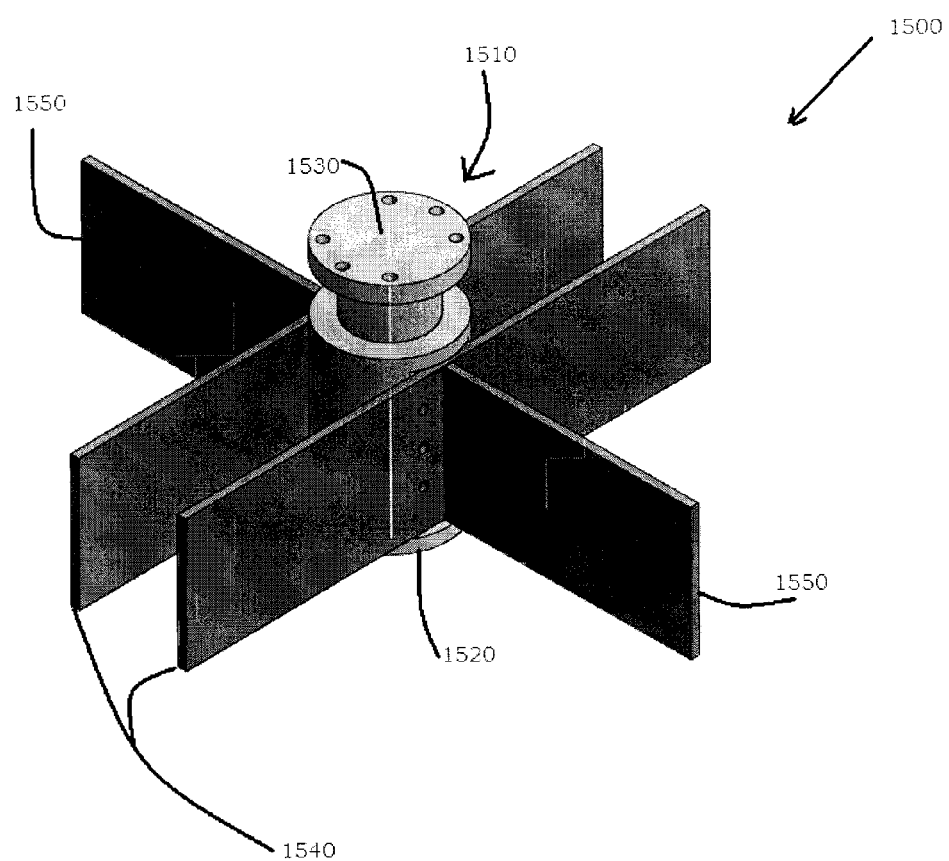
FIG. 11 is a view of a swivel motor mount in accordance with example embodiments.

As alluded to earlier, the sweep pivot assembly 1000 may be placed over a sump of a bin, for example, a grain bin. In example embodiments, the sweep pivot assembly 1000 may be held in place by a swivel motor mount assembly that may be connected to, or near, the aforementioned sump. FIG. 11 provides an example of a swivel motor mount assembly 1500 usable with the sweep pivot assembly 1000 of example embodiments. As shown in FIG. 11, the example swivel motor mount assembly 1500 may include a high pressure swivel 1510 which may include a stationary base 1520 and a rotating member 1530. In example embodiments, the stationary base 1520 may resemble a cylinder into which the rotating member 1530 (which may also resemble a cylinder) may be inserted. In example embodiments, the rotating member 1530 may rotate relative to the stationary base 1520. In example embodiments, the stationary base 1520 may be connected to a pair of first swivel supporting member 1540 which may in turn be connected to a pair of second swivel supporting members 1550. As shown in FIG. 11, the stationary base 1520 may include notches into which the pair of first swivel supporting members 1540 may be inserted. In example embodiments, ends of the first and second pairs of swivel supporting members 1540 and 1550 may connect to walls of a sump. For example, ends of the first and second pairs of swivel supporting members 1540 and 1550 may be welded to walls forming the sump. Example embodiments, however, are not limited thereto as ends of the first and second pairs of swivel supporting members 1540 and 1550 may be secured to the sump via intermediate structures (not shown), for example, plates, which may be bolted or welded to the sump walls.

In example embodiments the pair of first swivel supporting members 1540 may resemble rectangular plates as shown in FIG. 11, however, example embodiments are not limited thereto. For example, in the event the sump is formed to have inclined walls, ends of the pair of first swivel supporting members 1540 may be inclined to bear up against the inclined walls of the sump. Similarly, the pair of second swivel supporting members 1550 may resemble rectangular plates as shown in FIG. 11, however, example embodiments are not limited thereto. For example, if the sump is formed to have inclined walls, ends of the second pair of first swivel supporting members 1550 may be inclined to bear up against the inclined walls of the sump.

In example embodiments, because the pair of first swivel supporting members 1540 and the pair of second swivel supporting members 1550 may be placed inside of, and connected to, walls forming a sump of a bin, the swivel motor mount assembly 1500 may be secured to the sump of the bin. In example embodiments, a sweep swivel base 1250 (see FIG. 5) of the sweep swivel 1200 may be mounted on top of the rotating member 1530 and secured to the rotating member 1530 for example, by welding, bolting, riveting, or clamping. Thus, the sweep pivot assembly 1000 may be secured to a sump of a bin via the swivel motor mount assembly 1500.

Although FIG. 11 provides an example of a swivel motor mount assembly 1500, the invention is not limited thereto. For example, rather than providing two pairs of swivel supporting members, more or less members may be provided. Furthermore, a swivel motor mount assembly does not necessarily have to be provided in the sump. For example, a swivel motor mount assembly could be comprised of a metal ring surrounding the sump. The metal ring, for example, could be bolted to a floor of a bin (for example, a grain bin) by anchor bolts and the swivel supporting members could extend to the metal ring.

In example embodiments, the swivel motor mount assembly 1500 may be placed in a sump of a bin, for example, a grain bin. The swivel motor mount assembly 1500 may then be secured to walls of the sump by a conventional means such as welding or bolting. After the swivel motor mount assembly 1500 is mounted in the sump, the sweep pivot assembly 1000 may be mounted thereon by attaching the sweep swivel base 1250 of the sweep swivel 1200 to the rotating member 1530 of the swivel motor mount assembly 1500 by a conventional means such as welding, bolting, clamping, pinning, or riveting. After the sweep pivot assembly 1000 is attached to the swivel motor mount 1500, the arms 2000 and 3000 may be attached to the sweep pivot assembly 1000. Although this paragraph implies some sort of order with regard to constructing the bin sweep 100, the order is merely exemplary and is in no way intended to limit the scope of the invention. For example, rather than installing the swivel motor mount assembly 1500 in the sump and then attaching the sweep pivot assembly 1000 to the swivel motor mount assembly 1500, the swivel motor mount assembly 1500 and the sweep pivot assembly 1000 may be attached together and then attached, as a group, to the sump.

Referring to FIG. 3, each of the first arm 2000 and the second arm 3000 may be comprised of various sections. For example, the first arm 2000 may include a first section 2100, a second section 2200, a third section 2300, a fourth section 2400, and a fifth section 2500. Similarly, the second arm 3000 may include a first section 3100, a second section 3200, a third section 3300, a fourth section 3400, and a fifth section 3500. Although example embodiments illustrate the first and second arms 2000 and 3000 as being comprised of five sections, example embodiments are not limited thereto as the first and second arms 2000 and 3000 may have more or less than five sections. In example embodiments, the first section 2100 of the first arm 2000 may be connected to the sweep pivot assembly 1000 via the first connecting member 1100 and the first section 3100 of the second arm 3000 may be connected to the sweep pivot assembly 1000 via the second connecting member 1110.

In example embodiments, ends of the first and second arms 2000 and 3000 may include sweep end connection assemblies. The sweep end connection assemblies may be configured to contact (or nearly contact) walls of a bin (for example, a grain bin) so that the material near the bin walls may be moved away from the bin walls and to the material transfer devices of the arms 2000 and 3000. For example, in FIG. 1 a first end connection assembly 2600 and a second end connection assembly 3600 may be located near ends of the first arm 2000 and the second arm 3000, respectively.

In example embodiments, each of the first, second, third, fourth, and fifth sections 2100, 2200, 2300, 2400, and 2500 of the first arm 2000 and the first, second, third, fourth, and fifth sections 3100, 3200, 3300, 3400, and 3500 of the second arm 3000 may be substantially similar, thus, only a detailed description of one of the sections will be provided for the sake of brevity.

Figure 12:
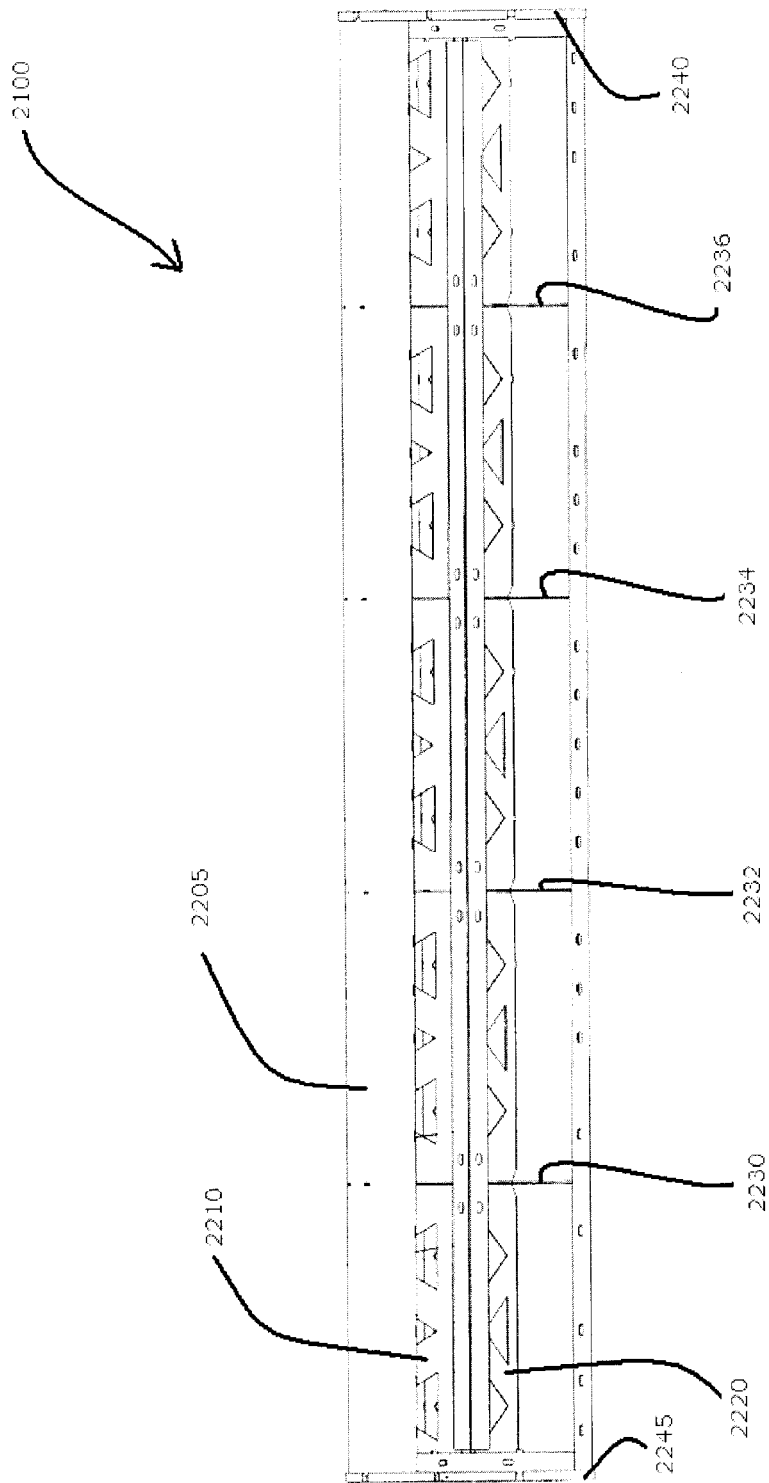
FIG. 12 is a view of an arm section in accordance with example embodiments.

FIG. 12 is a side view of the first section 2100 of the first arm 2000 in accordance with example embodiments. In example embodiments, the first section 2100 may resemble a roughly cylindrical structure having a first end plate 2240 at a first end of the first section 2100 and a second end plate 2245 at a second end of the first section 2100. Between the first end plate 2240 and the second end plate 2245 is an outside shell 2205 which may be reinforced by a plurality of stiffeners. For example, in example embodiments four transverse stiffeners 2230, 2232, 2234, and 2236 may be spaced along a length of the outside shell 2205 and three longitudinal stiffeners 2210, 2215, and 2220 may be provided to span a length of the outside shell 2205. Although example embodiments are described as having four transverse stiffeners and three longitudinal stiffeners, example embodiments are not limited thereto as there may be more or less than four transverse stiffeners and more or less than three longitudinal stiffeners.

Figure 13:
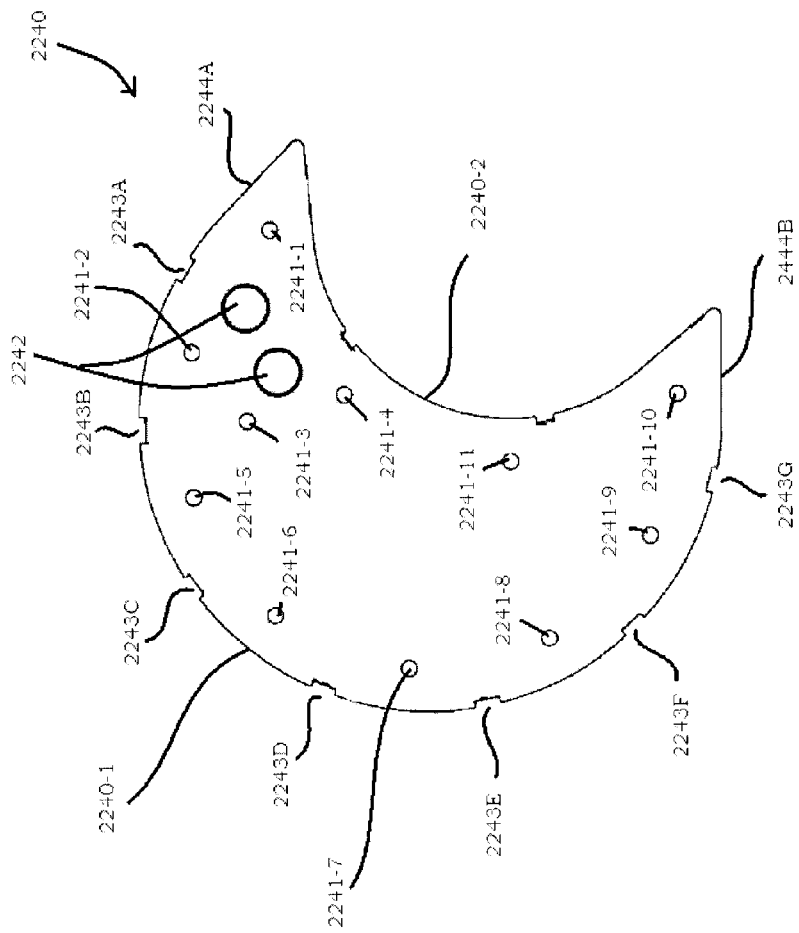
FIG. 13 is a view of an end plate in accordance with example embodiments.

FIG. 13 is a side view of the first end plate 2240 in accordance with example embodiments. Because the second end plate 2245 may be substantially the same as the first endplate 2240, for the sake of brevity, only the first end plate 2240 will be described with specificity.

Referring to FIG. 13 it is noted that the first end plate 2240 may have an irregular perimeter comprised of two portions, a substantially convex outer portion 2240-1 and a substantially concave inner portion 2240-2. Although the instant example shows the outer portion 2240-1 as resembling a partial semicircle, example embodiments are not limited thereto. For example, the outer convex portion 2240-1 could be resemble a partial triangle, a partial rectangle, a partial octagon, a partial hexagon, or a partial ellipse. Likewise, although the instant example shows the inner portion 2240-2 as resembling a partial semicircle, example embodiments are not limited thereto. For example, the inner concave portion 2240-2 could resemble a partial triangle, a partial rectangle, a partial octagon, a partial hexagon, or a partial ellipse. In example embodiments, the outer portion 2240-1 appears to resemble a semicircle, however, in example embodiments, various portions of the outer portion 2240-1 may be substantially flat. For example, as shown in FIG. 13, the outer portion 2240-1 of the first end plate 2240 may include a first flat portion 2244A and a second flat portion 2444B.

Referring to FIG. 13, the outer portion 2240-1 of the first end plate 2240 may include a plurality of notches configured to interact with a plurality of tabs that may be formed on the outside shell 2205. For example, in FIG. 13, the example end plate 2240 includes a first notch 2243A, a second notch 2243B, a third notch 2243C, a fourth notch 2243D, a fifth notch 2243E, a sixth notch 2243F, and a seventh notch 2243G. Although example embodiments illustrate the first end plate 2240 as having seven notches, example embodiments are not limited thereto. For example, the first end plate may have more or less than seven notches. In addition, example embodiments also provide for a first end plate 2240 which does not include any notches.

In example embodiments, the first end plate 2240 may include a first plurality of holes which may be used to connect the first end plate 2240 to the first connecting member 1010 of the pivot sweep pivot assembly 1000. In FIG. 13, for example, eleven holes 2241-1, 2241-2, 2241-3, 2241-4, 2241-5, 2241-6, 2241-7, 2241-8, 2241-9, 2241-10, and 2241-11 may be provided to facilitate a bolt type connection between the first end plate 2240 and the first connecting member 1010 of the sweep pivot assembly 1000. For example, as shown in FIG. 6, the first connecting member 1010 of the sweep pivot assembly 1000 may include eleven holes 1010-1, 1010-2, 1010-3, 1010-4, 1010-5, 1010-6, 1010-7, 1010-8, 1010-9, 1010-10, and 1010-11 (noting that the fourth hole 1010-4 is not shown in FIG. 6) which have substantially the same pattern as the eleven holes 2241-1, 2241-2, 2241-3, 2241-4, 2241-5, 2241-6, 2241-7, 2241-8, 2241-9, 2241-10, and 2241-11 illustrated in FIG. 13. Thus, the first connecting member 1010 may be connected to the first end plate 2240 by aligning the eleven holes 1010-1, 1010-2, 1010-3, 1010-4, 10-10-5, 1010-6, 1010-7, 1010-8, 1010-9, 1010-10, and 1010-11 of the first end plate 2240 with the eleven bolt holes 1010-1, 1010-2, 1010-3, 1010-4, 10-10-5, 1010-6, 1010-7, 1010-8, 1010-9, 1010-10, and 1010-11 of the first connecting member 1010 and then passing a bolt through each of the aligned holes to attach the first endplate 2240 to the first connecting member 1010. Although FIG. 13 illustrates the first end plate 2240 having eleven bolt holes, the number of holes is not meant to limit example embodiments. For example, the first end plate 2240 and the first connecting member 1010 may have more or less than eleven bolt holes. As another example, the first end plate 3240 may not include any bolt holes as the first end plate 3240 may be welded, or clamped to, the first connecting member 1010.

In example embodiments, the first endplate 2240 may also include a pair of holes 2242 through which lines, for example, hydraulic or electrical lines, may pass. Although FIG. 13 illustrates an embodiment of the first endplate 3240 as having only two holes through which lines may pass, this is not intended to limit example embodiments. For example, only a single hole, or more than two holes may be provided in the first end plate 3240 to provide a pathway through which a line (or lines) may pass. Also, in example embodiments, it is envisioned that the aforementioned lines may not pass through the first or second endplates 2240 and 2245, thus, it is possible that the endplates 2240 and 2245 may be formed without the pair of holes 2242.

Figure 14A:
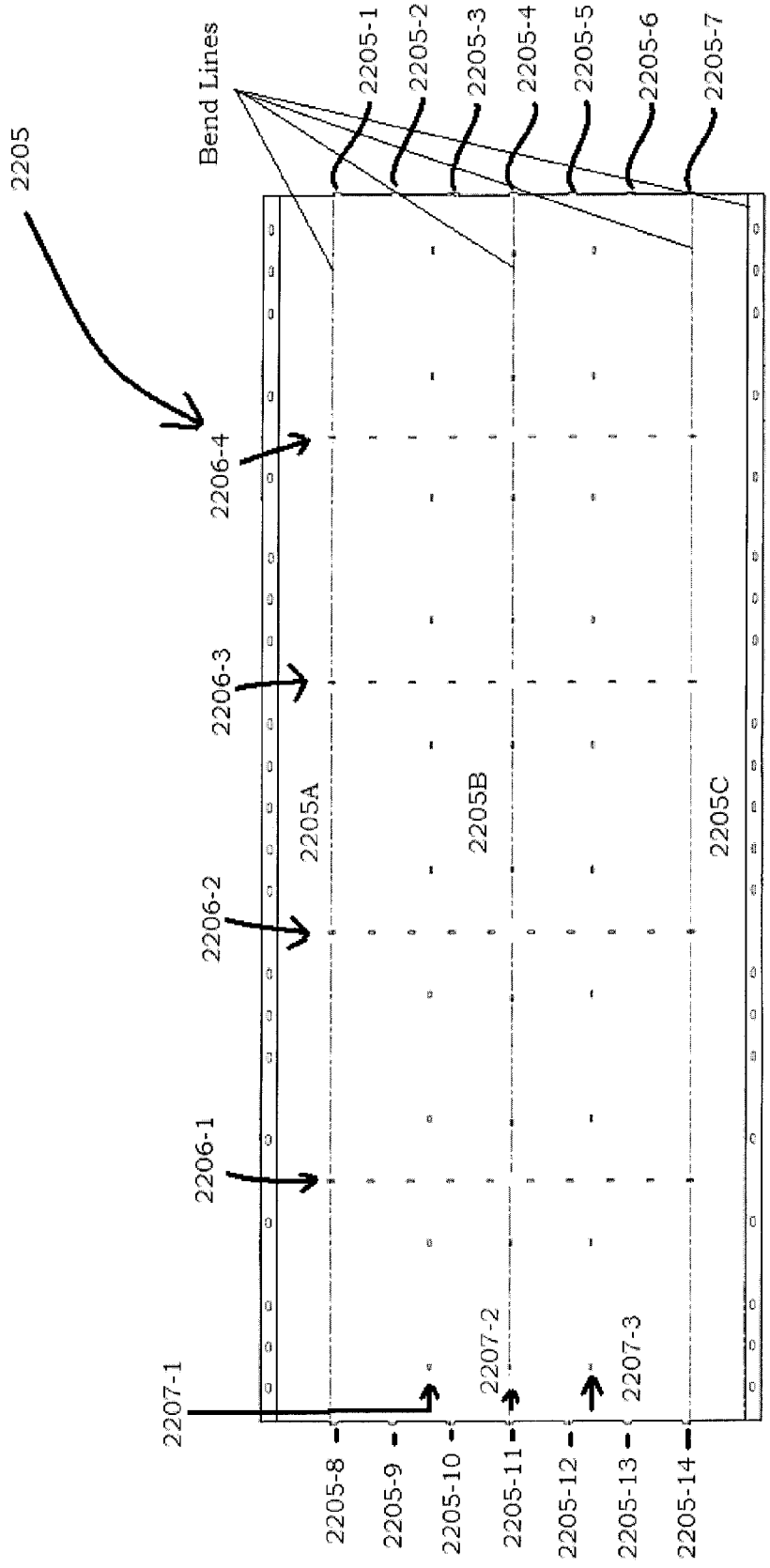
FIGS. 14A and B are views of an outside shell in accordance with example embodiments.

Referring to FIG. 12, the first and second end plates 2240 and 2245 may be connected together via an outside shell 2205, a non-limiting example of which is shown in FIGS. 14A and 14B. In FIGS. 14A and 14B the example outside shell 2205 is shown as being fabricated from a metal plate, for example, A36 steel, which is bent to have at least two flat sections 2205A and 2205C and one substantially curved section 2205B. In FIG. 14A, the example outside shell 2205 is shown in an unrolled configuration, that is, a flat configuration, whereas FIG. 14B shows a profile of the outside shell 2205 in a rolled configuration. The outside shell 2205, for example, may be formed from a relatively thin plate, for example, about 1/16", however, example embodiments are not limited thereto. For example, the outside shell 2205 may be formed from a plate material that is thicker or thinner than about 1/16". Furthermore, the outside shell need not be formed from a metal material since the outside shell may be formed as a casted or molded member. For example, the outside shell may be fabricated from plastic formed in a casting process or a composite material formed in a spinning process.

As shown in FIG. 14A, the example outside shell 2205 may be formed to have tabs protruding from ends thereof. For example, as shown in FIG. 14A, a first side of the outside shell 2205 may be formed to have seven tabs 2205-1, 2205-2, 2205-3, 2205-4, 2205-5, 2205-6, and 2205-7 which may be configured to interface with the seven notches 2243A, 2243B, 2243C, 2243D, 2243E, 2243F, and 2243G of the first end plate 2240 illustrated in FIG. 13. Similarly, a second side of the outside shell 2205 may be formed to include seven tabs 2205-8, 2205-9, 2205-10, 2205-11, 2205-12, 2205-13, and 2205-14 which may interface with seven notches formed in the second plate 2245, which, as indicated earlier, may have substantially the same configuration as the first end plate 2240. Thus, the outside shell 2205 may be attached to the first and second endplates 2240 and 2245 via the illustrated tabs and notches. In addition, the connections may be reinforced by welding the tabs to the notches or welding the outside shell 2205 to the first and second end plates 2240 and 2245. Furthermore, additional connections may be provided to bolt the outside shell 2205 to the end plates 2240 and 2245.

In example embodiments, the outside shell may also be formed with a plurality of holes configured to interface with a plurality of tabs of a plurality of stiffeners that may be provided to stiffen the outside shell 2205. For example, as shown in FIG. 14A, the example outside shell 2205 may include four groups of holes 2206-1, 2206-2, 2206-3, and 2206-4 configured to interface with protrusions that may be formed on the transverse stiffeners 2230, 2232, 2234, and 2236. The outside shell may also include three additional groups of holes 2207-1, 2207-2, and 2207-3 that may be configured to interface with protrusions that may be formed on the longitudinal stiffeners 2210, 2215, and 2220. Although each group is illustrated as having ten different holes, example embodiments are not limited thereto. For example, each group of holes 2206-1, 2206-2, 2206-3, 2206-4, 2207-1, 2207-2, and 2207-3 may include more or less than ten holes. In addition, because the transverse stiffeners 2230, 2232, 2234, and 2236 and the longitudinal stiffeners 2210, 2215, and 2220 may be formed without tabs, the seven groups of holes 2206-1, 2206-2, 2206-3, 2206-4, 2207-1, 2207-2, and 2207-3 may be omitted entirely. In this case, the transverse and longitudinal stiffeners may simply be welded or bolted to the outside shell 2205.

Figure 15:
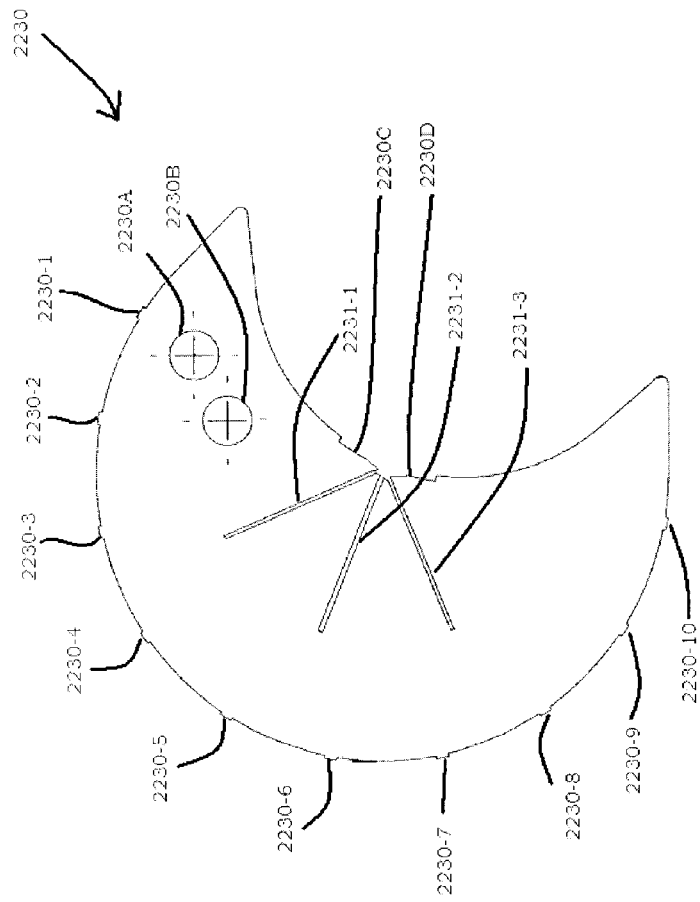
FIG. 15 is a view of a transverse stiffener in accordance with example embodiments.

FIG. 15 is a view of the first transverse stiffener 2230 in accordance with example embodiments. Like the end plate 2240, the first transverse stiffener 2230 may include an outer substantially convex portion and an inner substantially concave portion. In example embodiments, the outer substantially convex portion may closely match an inside profile of the outside shell 2205. As shown in FIG. 15, the outer substantially convex portion may include ten tabs 2230-1, 2230-2, 2230-3, 2230-4, 2230-5, 2230-6, 2230-7, 2230-8, 2230-9, and 2230-10. As alluded to earlier, the ten tabs 2230-1, 2230-2, 2230-3, 2230-4, 2230-5, 2230-6, 2230-7, 2230-8, 2230-9, and 2230-10 on the outer substantially convex portion may be inserted into the first group of holes 2206-1 illustrated in FIG. 14A.

In example embodiments, three slits 2231-1, 2231-2, and 2231-3 may extend from the inner substantially concave portion of the first transverse stiffener 2230. The slits 2231-1, 2231-2, and 2231-3 may be configured to engage slits faulted in the transverse stiffeners 2210, 2215, and 2220. For example, first longitudinal stiffener 2210 may be slid into the first slit 2231-1 of the first transverse stiffener 2230, the second longitudinal stiffener 2215 may be slid into the second slit 2231-2 of the first transverse stiffener 2230, and the third longitudinal stiffener 2225 may be slid into the second slit 2231-2 of the first transverse stiffener 2230.

In example embodiments, the transverse stiffeners 2230, 2232, 2234, and 2236 may also include a plurality of holes through which lines, for example, hydraulic or electric lines, may pass. For example, in FIG. 15, two holes 2230A and 2230B may be provided in the are shown through which hydraulic or electric lines may pass. Although FIG. 15 shows two holes being provided for lines, such as hydraulic and/or electric lines, example embodiments are not limited thereto. For example, only a single or more than two holes may be provided for lines to pass through.

In example embodiments, each of the first, second, third, and fourth transverse stiffeners 2230, 2232, 2234, and 2236 may be substantially the same. For example, each of the second, third, and fourth transverse stiffeners 2232, 2234, and 2236 may substantially resemble the first transverse stiffener 2230. For example, each of the second, third, and fourth transverse stiffeners 2232, 2234, and 2236 may have an outer substantially convex portion and an inner substantially concave portion, a plurality of tabs along their outer substantially convex portions, a plurality of slits extending from their inner substantially concave portions, and a plurality of holes to allow lines, for example, electric lines or hydraulic lines, to pass through. Due to the structural similarity of the transverse stiffener plates, a detailed description of the second, third, and fourth transverse stiffeners 2232, 2234, and 2236 is omitted for the sake of brevity.

Figure 16:
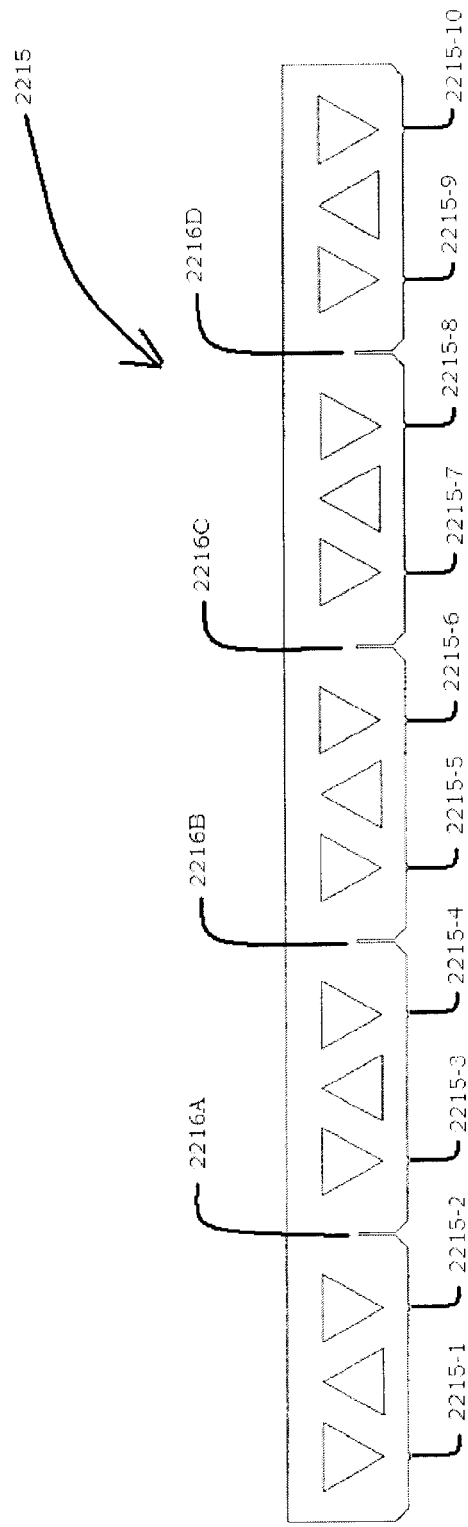
FIG. 16 is a view of a longitudinal stiffener in accordance with example embodiments.

FIG. 16 illustrates an example of the second longitudinal stiffener 2215 in accordance with example embodiments. As shown in FIG. 16, the second longitudinal stiffener 2215 may resemble a rectangular plate having a plurality of tabs and slits extending from one side thereof. For example, as shown in FIG. 16, ten tabs 2215-1, 2215-2, 2215-3, 2215-4, 2215-5, 2215-6, 2215-7, 2215-8, 2215-9, and 2215-10 may extend from a first side of the second longitudinal stiffener 2215. In addition to the tabs 2215-1, 2215-2, 2215-3, 2215-4, 2215-5, 2215-6, 2215-7, 2215-8, 2215-9, and 2215-10, the second longitudinal stiffener 2215 may also include a first slit 2216A, a second slit 2216B, a third slit 2216C, and a fourth slit 2216D extending from the first side. Furthermore, holes, for example, triangular holes, may be formed in the second longitudinal stiffener 2215.

In example embodiments, the second longitudinal stiffener 2215 may be inserted into the second slit 2231-2 of the first transverse stiffener 2230 such that the first slit 2216A of the second longitudinal stiffener 2215 and the second slit 2231-2 of the first transverse stiffener 2230 overlap one another as the second longitudinal stiffener 2215 is inserted into the second slit 2231-2 of the first transverse stiffener 2230. Similarly, the second, third, and fourth slits 2216B, 2216C, and 2216D would over lap the second slits associated with the second, third, and fourth transverse stiffeners 2232, 2234, and 2236. Because the transverse stiffeners 2230, 2232, 2234, and 2236 include slits which engage slits 2216A, 2216B, 2216C, and 2216D of the second longitudinal stiffener 2215, the transverse stiffeners 2230, 2232, 2234, and 2236 and the second longitudinal stiffener 2215 may form a locked structure.

As mentioned above, the second longitudinal stiffener 2215 may include ten tabs 2215-1, 2215-2, 2215-3, 2215-4, 2215-5, 2215-6, 2215-7, 2215-8, 2215-9, and 2215-10 extending from a first side thereof. These tabs may be inserted into the second group of holes 2207-2 illustrated in FIG. 14A. Although the second longitudinal stiffener 2215 are illustrated as including ten tabs, example embodiments are not limited thereto as the second longitudinal stiffener 2215 may include more or less than ten tabs.

Figure 17A:
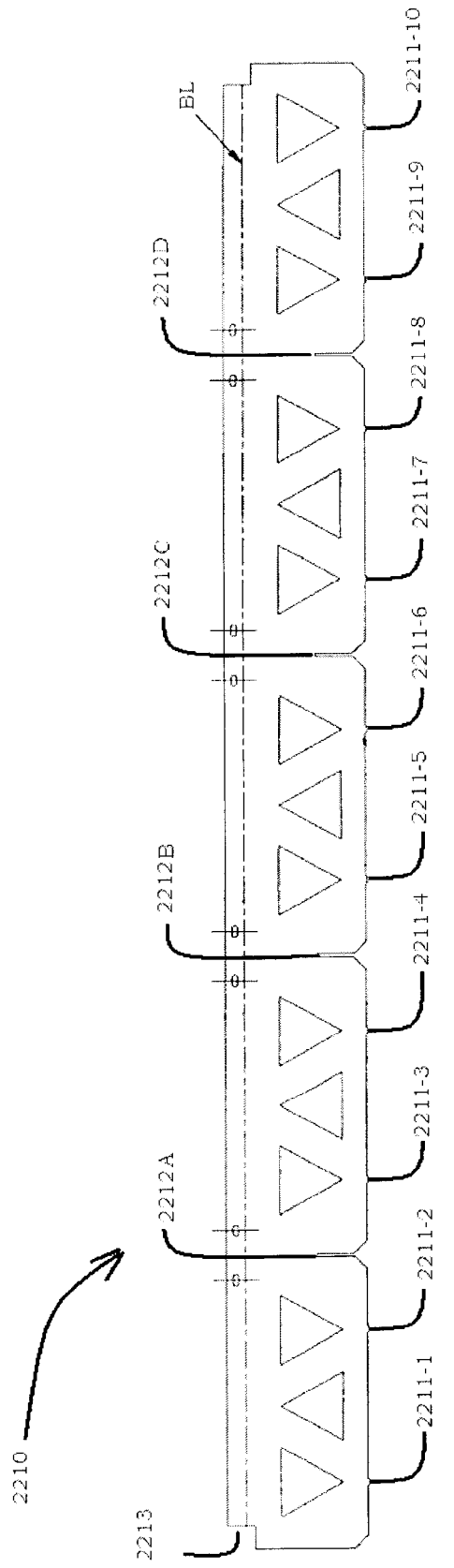
FIGS. 17A and 17B are views of a longitudinal stiffener in accordance with example embodiments.
Figure 17B:
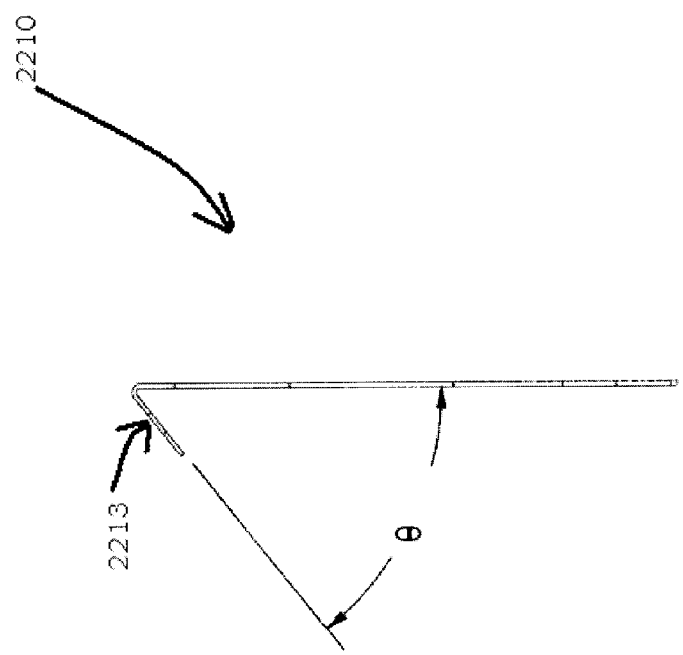

FIGS. 17A and 17B illustrates an example of the first longitudinal stiffener 2210 in accordance with example embodiments. As shown in FIGS. 17A and 17B, the first longitudinal stiffener 2210 may resemble a rectangular plate having a plurality of tabs and slits extending from one side thereof. For example, as shown in FIG. 17A, ten tabs 2211-1, 2211-2, 2211-3, 2211-4, 2211-5, 2211-6, 2211-7, 2211-8, 2211-9, and 2211-10 may extend from a first side of the first longitudinal stiffener 2210. In addition to the tabs 2211-1, 2211-2, 2211-3, 2211-4, 2211-5, 2211-6, 2211-7, 2211-8, 2211-9, and 2211-10, the first longitudinal stiffener 2210 may also include a first slit 2212A, a second slit 2212B, a third slit 2212C, and a fourth slit 2212D extending from the first side. Furthermore, holes, for example, triangular holes may be formed in the first longitudinal stiffener 2210.

In example embodiments, the first longitudinal stiffener 2210 may be inserted into the first slit 2231-1 of the first transverse stiffener 2230 such that the first slit 2212A of the first longitudinal stiffener 2210 and the first slit 2231-1 of the first transverse stiffener 2230 overlap one another as the first longitudinal stiffener 2210 is inserted into the first slit 2231-1 of the first transverse stiffener 2230. Similarly, the second, third, and fourth slits 2212B, 2212C, and 2212D would over lap the first slits associated with the second, third, and fourth transverse stiffeners 2232, 2234, and 2236. Because the transverse stiffeners 2230, 2232, 2234, and 2236 include slots which engage slots 2212A, 2212B, 2212C, and 2212D of the first longitudinal stiffener 2210, the transverse stiffeners 2230, 2232, 2234, and 2236 and the first longitudinal stiffener 2210 may form a locked structure.

As mentioned above, the first longitudinal stiffener 2215 may include ten tabs 2211-1, 2211-2, 2211-3, 2211-4, 2211-5, 2211-6, 2211-7, 2211-8, 2211-9, and 2211-10 extending from a first side thereof. These tabs may be inserted into the first group of holes 2207-1 illustrated in FIG. 14A. Although the first longitudinal stiffener 2210 is illustrated as including ten tabs, example embodiments are not limited thereto as the first longitudinal stiffener 2210 may include more or less than ten tabs.

Unlike the second longitudinal stiffener 2215, the first longitudinal stiffener 2210 may include a bent portion 2213 which may be configured to bear up against a stiffener receiving portion 2230C which may be recessed in the transverse stiffeners, an example of the stiffener receiving portion 2230C being illustrated in FIG. 15. In example embodiments, the bend angle θ may be about 50 degrees.

In example embodiments, the third longitudinal stiffener 2220 may be substantially the same as the first longitudinal stiffener 2210, thus a detailed description thereof is omitted for the sake of brevity. However, unlike the first longitudinal stiffener 2210, the third longitudinal stiffener may be configured to slide into the third slit 2231-3 formed in the transverse stiffener plates. Furthermore, whereas the first longitudinal stiffener 2210 includes a bent portion 2213 configured to interface with the stiffener receiving portion 2230C of the transverse stiffeners, the third longitudinal stiffener 2210 may have a bent portion configured to interface with the receiving portion 2230D of the transverse stiffeners.

In example embodiments, various sections of the first arm 2000 and the second arm 3000 may be connected to one another by connection assemblies. For example, as shown in FIG. 3, the first section 2100 of the first arm 2000 may be connected to the second section 2200 of the first arm 2000 by a first connection assembly 2150, the second section 2200 of the first arm 2000 may be connected to the third section 2300 of the first arm 2000 by a second connection assembly 2250, the third section 2300 of the first arm 2000 may be connected to the fourth section 2400 of the first arm 2000 by a third connection assembly 2350, the fourth section 2400 of the first arm 2000 may be connected to the fifth section 2500 of the first arm 2000 by a fourth connection assembly 2450, an end of the fifth section 2500 of the first arm 2000 may be connected to the first end assembly 2600 by a fifth connection assembly 2550. Similarly, the first section 3100 of the second arm 3000 may be connected to the second section 3200 of the second arm 3000 by a sixth connection assembly 3150, the second section 3200 of the second arm 3000 may be connected to the third section 3300 of the second arm 3000 by a seventh connection assembly 3250, the third section 3300 of the second arm 3000 may be connected to the fourth section 3400 of the second arm 3000 by an eighth connection assembly 3350, and the fourth section 3400 of the second arm 3000 may be connected to the fifth section 3500 of the second arm 3000 by a ninth connection assembly 3450, and an end of the fifth section 3500 may be supported by a tenth connection assembly 3550.

In example embodiments, the first, second, third, fourth, sixth, seventh, eighth, and ninth connection assemblies 2150, 2250, 2350, 2450, 3150, 3250, 3350, and 3450 may be configured to not only join adjacent arm sections, but may be configured to provide vertical support for the arm sections and support for a material moving device, for example, an auger, that may be at least partially enclosed by the various section 2100, 2200, 2300, 2400, 2500, 3100, 3200, 3300, 3400, and 3500.

Figure 18A:
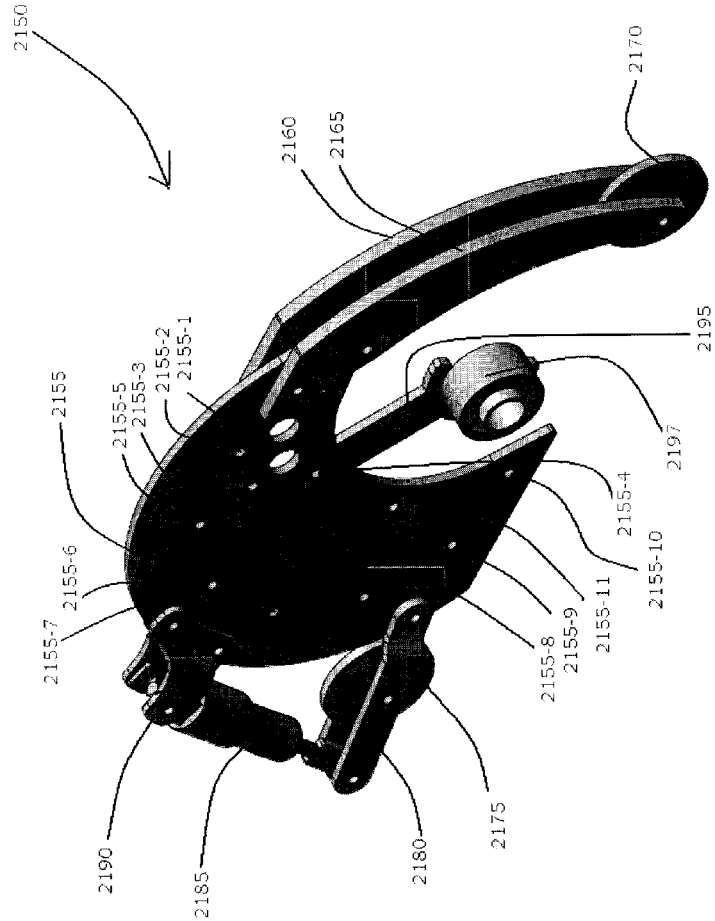
FIGS. 18A-C are views of connection assemblies in accordance with example embodiments.

FIG. 18A illustrates a non-limiting example of a connection assembly. In particular, FIG. 18A provides an example of the first connection assembly 2150 in accordance with example embodiments. This example connection assembly may be substantially similar to the second, fourth, fifth, sixth, seventh, ninth, and tenth connection assemblies 2250, 2450, 2550, 3150, 3250, 3450, and 3550 thus, a detailed description thereof will be omitted for the sake of brevity.

Referring to FIG. 18A, the first connection assembly 2150 may include a connection plate 2155 having a plurality of holes 2155-1, 2155-2, 2155-3, 2155-4, 2155-5, 2155-6, 2155-7, 2155-8, 2155-9, 2155-10, and 2155-11. The pattern of the plurality of holes 2155-1, 2155-2, 2155-3, 2155-4, 2155-5, 2155-6, 2155-7, 2155-8, 2155-9, and 2155-10 may be similar to the pattern of holes of an end plate associated with an arm section. For example, the pattern of holes 2155-1, 2155-2, 2155-3, 2155-4, 2155-5, 2155-6, 2155-7, 2155-8, 2155-9, 2155-10, and 2155-11 of the first connection assembly 2150 may be substantially the same as the pattern of holes 2241-1, 2241-2, 2241-3, 2241-4, 2241-5, 2241-6, 2241-7, 2241-8, 2241-9, 2241-10, and 2241-11 of the first end plate 2240 (see FIG. 13). Because the patterns of holes of two adjacent end plates of two different but adjacent sections may be the same as the pattern of holes 2155-1, 2155-2, 2155-3, 2155-4, 2155-5, 2155-6, 2155-7, 2155-8, 2155-9, 2155-10, and 2155-11 provided in the connection plate 2155, two end plates of different sections may be used to sandwich the connection plate 2155 such that the plurality of holes in the end plates and the connection plate are aligned. In this configuration, the three plates may be connected to each other via bolting. Thus, the connection plate 2155 may serve to connect two adjacent arm sections to one another.

Figure 18B:
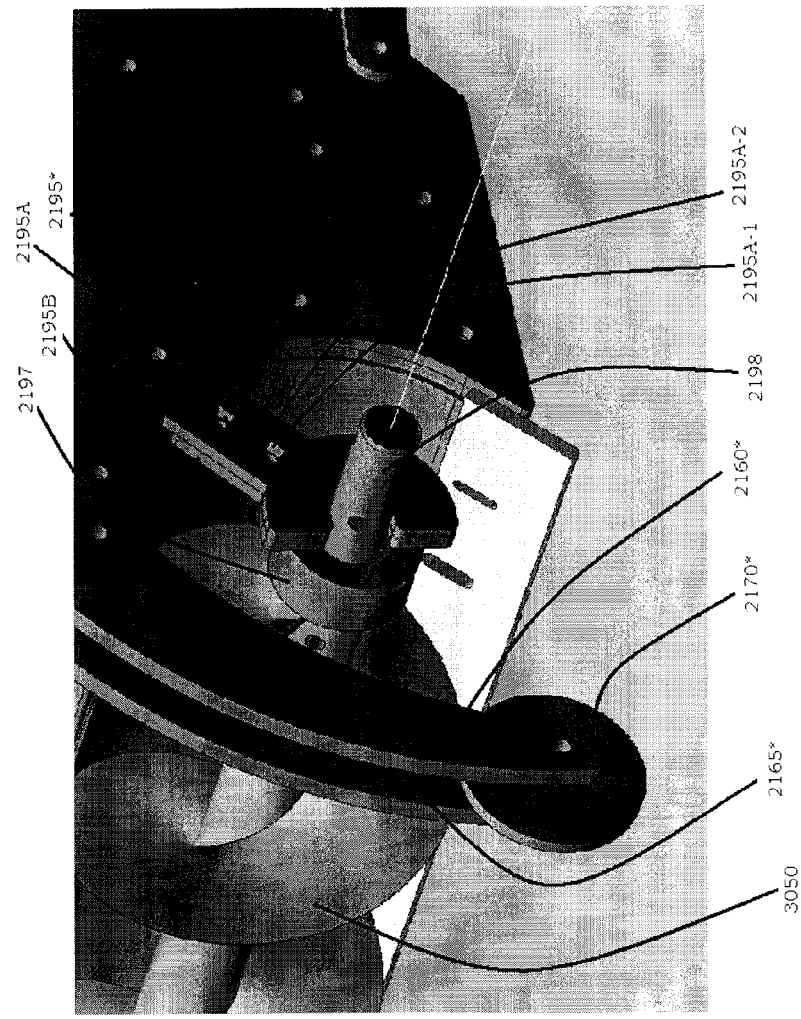

In FIG. 18A, the connection plate 2155 is illustrated as including an arm 2195 onto which an auger bearing housing 2197 may be attached. The auger bearing housing 2197 may support an auger bearing which may support an auger 3050 (see FIG. 18B) and allow for power to be transmitted from one auger of one section to another auger in an adjacent section. FIG. 18B provides another example of a connection assembly in accordance with example embodiments. Because this embodiment is substantially similar to the example connection assembly 2150 illustrated in FIG. 18A, only the substantial differences will be pointed out.

Figure 18C:
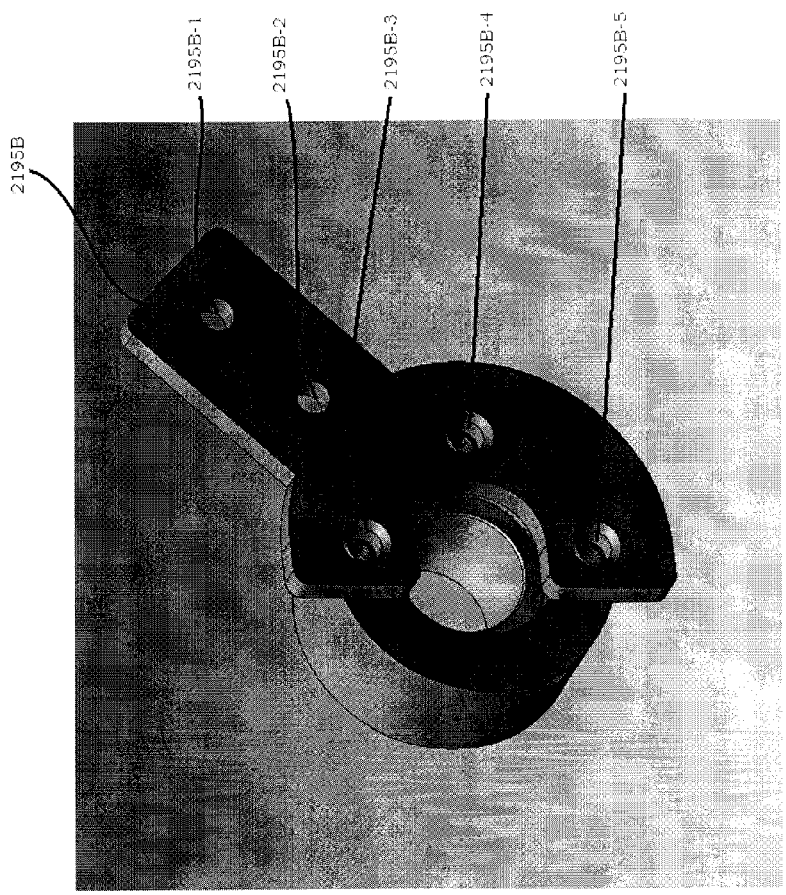

In the connection assembly 2150 illustrated in FIG. 18A, the connection assembly 2150 includes an arm 2195 which is a substantially unitary member. In FIG. 18B, however, the arm 2195* is illustrated as being comprised of a first arm plate 2195A and a second arm plate 2195B. An example of the second arm plate 2195B is illustrated in greater detail in FIG. 18C. Referring to FIG. 18C, the second arm plate 2195B may include a substantially rectangular portion having a first hole 2195B-1 and a second hole 2195B-2 and a substantially semi-circular area having a third hole 2195B-3, a fourth hole 2195B-4, and a fifth hole 2195B-5. In example embodiments the third hole 2195B-3, the fourth hole 2195B-4, and the fifth hole 2195B-5 may align with bolt holes that may be provided in the auger bearing housing 2197. Thus, the third hole 2195B-3, the fourth hole 2195B-4, and the fifth hole 2195B-5 may allow the auger bearing housing 2197 to be fastened to the second arm plate 2195 via bolts or screws. Example embodiments, however, are not limited thereto as the second arm plate 2195B may alternatively be welded or clamped to the auger bearing housing 2197.

In example embodiments, the first arm plate 2195A may include a couple of holes 2195A-1 and 2195A-2 that may be spaced so as to be alignable with the first and second holes 2195B-1 and 2195B-2 of the second arm plate 2195B. In example embodiments, the couple of holes 2195A-1 and 2195A-2 in the first arm plate 2195A may be substantially square and may be configured to interface with carriage bolts which may be inserted therein to secure the second arm plate 2195B to the first arm plate 2195A. The securing may be accomplished by aligning the first and second holes 2195B-1 and 2195B-2 with the couple of holes 2195A-1 and 2195A-2 and then feeding bolts, for example, carriage bolts, therethrough to fasten the first and second arm plates 2195A and 2195B together. A particular advantage of using an arm comprised of two armplates is that the first armplate 2195A protects the three bolts that may be used to attach the second arm plate 2195B to the auger bearing housing 2197. For example, the first arm plate 2195A may protect the bolts connecting the second arm plate 2195B to the auger bearing housing 2197 from material such as grain.

In example embodiments, at least one support wheel may be attached to the connection plate 2155 to provide vertical support for the connection plate 2155 and allow the arm sections to move around the sweep pivot assembly 1000. For example, as shown in FIG. 18A, two support wheels 2170 and 2175 (an example of at least one support wheel) may be attached to the connection plate 2155. The support wheels 2170 and 2175 may provide vertical support of the various arm sections and allow the arm sections to move around the sweep pivot assembly 1000 without little to no resistance. In example embodiments, the first support wheel 2170 may be attached to the connection plate 2155 via first and second sweep plates 2160 and 2165. Although FIG. 18A illustrates the first and second sweep plates 2160 and 2165 as being relatively long and curved, example embodiments are not limited thereto as the plates may have any suitable shape including a straight shape and an "L" shape.

In example embodiments, the sweep plates 2160 and 2165 may be secured to the connection plate 2155 by a pair of bolts. For example, as shown in FIG. 18A, a pair of bolt holes (two of which are shown in the first plate 2165) may be provided at the ends of the sweep plates 2160 and 2165. Though not shown in FIG. 18A, the connection plate 2155 may also include a pair of holes having the same pattern as the holes formed in the end of the sweep plates 2160 and 2165. In example embodiments, the sweep plates 2160 and 2165 may sandwich the connection plate 2155 as shown in FIG. 18A such that the bolt holes in the sweep plates 2160 and 2165 and the connection plate 2155 are aligned. This configuration allows for bolts to be inserted therethrough to secure the sweep plates 2160 and 2165 to the connection plate 2155. Example embodiments, however, are not limited by the instant connection method. For example, rather than bolting the sweep plates 2160 and 2165 to the connection plate 2155, the sweep plates 2160 and 2165 may be welded to the connection plate 2155.

In example embodiments, the second support wheel 2175 may be attached to the connection plate 2155 via a pair of linkages 2180. For example, the support wheel 2175 may be pinned between ends of the linkages 2180 as shown in FIG. 18A so that the wheel 2175 may rotate freely within the linkages 2180. The linkages 2180 may, in turn, have one end pinned, for example, by bolting, to the connection plate 2155 and another end pinned to a biasing member 2185, for example, a spring, which in turn may be pin-connected to the extension plate 2155 by a bracket 2190. Given the manner in which the connection plate 2155 is supported by the pair of support wheels 2170 and 2175, the connection plate 2155 may have some ability to displace vertically.

In addition to the aforementioned features, the connection plate 2155 may also include a pair of holes through which lines, for example, electrical or hydraulic lines, may pass. The pair of holes are illustrated in FIG. 18A as the relatively large holes arranged between holes 2155-1, 2155-2, 2155-3, and 2155-4. Although a pair of holes is shown, example embodiments are not limited thereto. For example, rather than providing a pair of holes, only a single hole may be provided to allow the lines to pass therethrough. In the alternative, more than two holes may be provided to allow the lines to pass therethrough.

Although FIG. 18A provides, in detail, an example of the first connection assembly 2150, it should be understood that each of the second, fourth, fifth, sixth, seventh, ninth, and tenth connection assemblies 2250, 2450, 2550, 3150, 3250, 3450, and 3550 may have substantially the same configuration. Thus, a detailed description thereof is omitted for the sake of brevity. Furthermore, various modifications may be made to example embodiments. For example, in FIG. 18A, the first and second wheels may be configured to swivel thus allowing the wheels to rotate as the arms turn.

Figure 19:
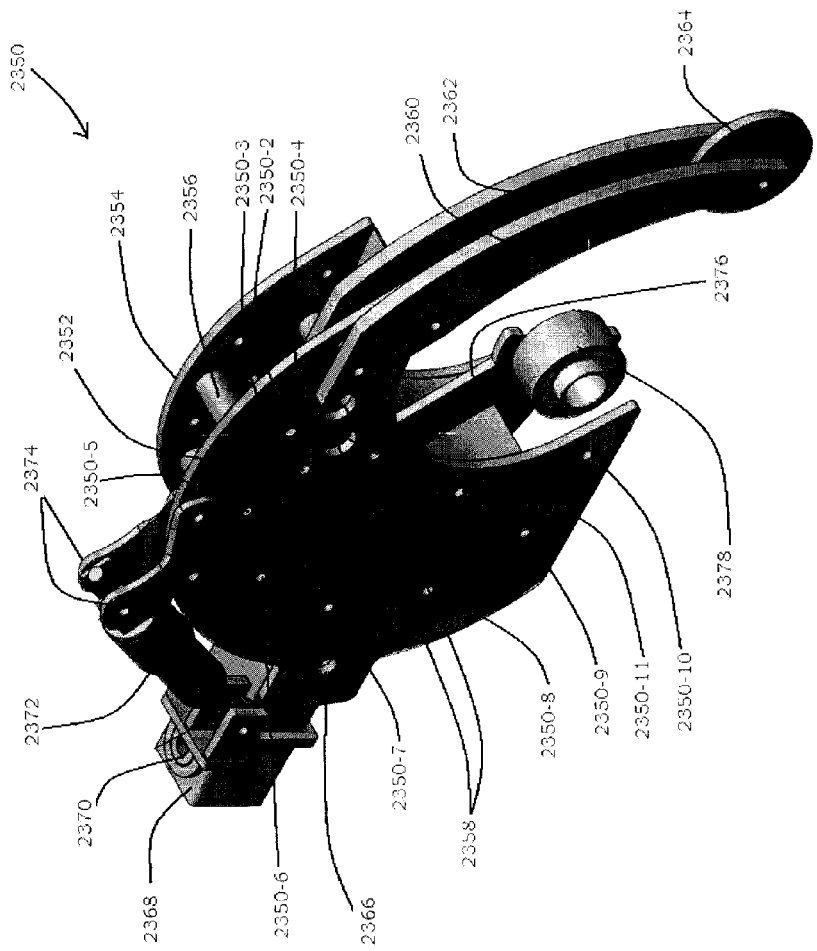
FIG. 19 is a view of a connection assembly in accordance with example embodiments.

FIG. 19 is a view of another connection assembly according to example embodiments, in particular, FIG. 19 illustrates an example of the third connection assembly 2350 illustrated in FIG. 3. The third connection assembly 2350 may be different from first connection assembly 2150 in several respects. For example, the third connection assembly 2350 may include a pair of connection plates 2352 and 2354 rather than a single connection plate 2155 as illustrated in FIG. 18A. In example embodiments the pair of connection plates 2352 and 2354 may be separated by a plurality of spacers 2356. The spacers 2356 may, for example, resemble tubular structures that may be welded or bolted to the pair of connection plates 2352 and 2354. In the alternative, holes may be provided in the pair of connection plates 2352 corresponding to placements of the spacers 2356. Bolts may then pass through the holes provided in the plates and through the spaces to secure the spacers 2356 in place and connect the connection plates 2352 and 2354 to one another. Although example embodiments have described the spacers 2356 as being tubular structures, example embodiments are not limited thereto. For example, the spacers 2356 could be solid members or members having an open cross-sections such as a C-shape, an I-shape, or a U-shape.

In example embodiments, each of the connection plates 2352 and 2354 may include a plurality of holes to facilitate a connection between the connection plates 2352 and 2354 and nearby arm sections. For example, as shown in FIG. 19, the first connection plate 2352 may include a plurality of holes 2350-1, 2350-2, 2350-3, 2350-4, 2350-5, 2350-6, 2350-7, 2350-8, 2350-9, 2350-10, and 2350-11 (noting that 2350-1 is not shown). Likewise, the second connection plate 2354 may include a similar arrangement of holes. The pattern of holes 2350-1, 2350-2, 2350-3, 2350-4, 2350-5, 2350-6, 2350-7, 2350-8, 2350-9, 2350-10, and 2350-11 may be similar to the pattern of holes of an end plate associated with an arm section. For example, the pattern of holes 2350-1, 2350-2, 2350-3, 2350-4, 2350-5, 2350-6, 2350-7, 2350-8, 2350-9, 2350-10, and 2350-11 of the third connection assembly 2350 may be substantially the same as the pattern of holes 2241-1, 2241-2, 2241-3, 2241-4, 2241-5, 2241-6, 2241-7, 2241-8, 2241-9, 2241-10, and 2241-11 of the first end plate 2240 that may be associated with the third section 2300. Because the patterns of holes of an adjacent end plate (for example, an endplate of section 2300) may be the same as the pattern of holes 2350-1, 2350-2, 2350-3, 2350-4, 2350-5, 2350-6, 2350-7, 2350-8, 2350-9, 2350-10, and 2350-11 provided in the first connection plate 2352, the adjacent end plate may be arranged to that its holes align with the holes 2350-1, 2350-2, 2350-3, 2350-4, 2350-5, 2350-6, 2350-7, 2350-8, 2350-9, 2350-10, and 2350-11 provided in the first connection plate 2352. In this configuration, the adjacent endplate may be secured to the first connection plate 2352 by bolting. The second connection plate 2354 may be connected to another endplate (for example, an endplate of the fourth section 2400) similarly.

Although example embodiments describe the first and second connection plates 2352 being bolted to adjacent endplates of different arm sections, example embodiments are not limited thereto. For example, rather than using a bolting method, the end plates of the different sections may be welded, riveted, clipped, clamped, and/or pinned to the first and second connection plates 2352 and 2354.

In FIG. 19, the connection plate 2352 is illustrated as including an arm 2376 into which an auger bearing housing 2378 may be attached. The auger bearing housing 2378 may support an auger bearing which in turn may support an auger and allow for power to be transmitted from one auger of one section to another auger in an adjacent section.

In example embodiments, at least one support wheel may be attached to the connection plate 2352 to provide vertical support for the connection plate 2352 and allow the sweep sections to move around the sweep pivot assembly 1000. For example, as shown in FIG. 19, one support wheel 2364 (an example of at least one support wheel) may be attached to the connection plate 2352. The support wheel 2364 may provide vertical support of the various sections and allow the sweep sections to move around the sweep pivot assembly 1000 without little to no resistance. In example embodiments, the first support wheel 2364 may be attached to the first connection plate 2352 via first and second sweep plates 2360 and 2362. Although FIG. 19 illustrates the first and second sweep plates 2360 and 2362 as being relatively long and curved, example embodiments are not limited thereto as the plates may have any suitable shape including a straight shape and an "L" shape.

In example embodiments, the sweep plates 2360 and 2362 may be secured to the first connection plate 2352 by a pair of bolts. For example, as shown in FIG. 19, a pair of bolt holes (two of which are shown in the first plate 2360) may be provided at the ends of the sweep plates 2360 and 2362. Though not shown in FIG. 18A, the first connection plate 2352 may also include a pair of holes having the same pattern as the holes formed in the end of the sweep plates 2360 and 2362. In example embodiments, the sweep plates 2360 and 2362 may sandwich the first connection plate 2352 as shown in FIG. 19 such that the bolt holes in the sweep plates 2360 and 2362 and the first connection plate 2352 are aligned. This configuration, thus, allows for bolts to be inserted therethrough to secure the sweep plates 2360 and 2362 to the first connection plate 2352. Example embodiments, however, are not limited by the instant connection method. For example, rather than bolting the sweep plates 2360 and 2362 to the first connection plate 2352, the sweep plates 2360 and 2362 may be welded to the first connection plate 2352.

In example embodiments, a drive motor arm 2368, an example of which is shown in FIG. 19, may be attached to the both of the first and second connection plates 2352 and 2354. As shown in FIG. 19, the first connection plate 2352 may include a tab having a hole 2366. Though not shown in FIG. 19, the second connection plate 2354 may include a substantially similar tab with a substantially similar hole. The drive motor arm 2368 may resemble a rectangular tube having a hole formed at one end thereof. The hole at the end of the rectangular tube may be aligned with the hole 2366 formed in the tab of the first connection plate 2352 and the hole formed in the tab of the second connection 2354. A bolt they then be inserted into the hole 2366 of the first connection plate 2352, the holes in the rectangular tube, and the hole in the tab of the second connection plate 2354 to secure the drive motor arm 2368 to the first and second connection plates 2352 and 2354.

In example embodiments, the drive motor arm 2368 may also be supported by a biasing member 2372, for example, a spring, that may be attached to the first connection plate 2352 by a pair of sweep plates 2374. Thus, the drive motor arm 2368 has some vertical flexibility with respect to the first and second connection plates 2352 and 2354.

In addition to the aforementioned features, the connection plates 2352 and 2354 may also include a pair of holes 2358 through which lines, for example, electrical or hydraulic lines, may pass. The pair of holes 2358 are illustrated in FIG. 19 as the being associated with the first connecting plate 2352. Though not shown, the second connection plate 2354 may also include similar holes. Although a pair of holes 2358 is shown, example embodiments are not limited thereto. For example, rather than providing a pair of holes, only a single hole may be provided to allow the lines to pass therethrough. In the alternative, more than two holes may be provided to allow the lines to pass therethrough.

Figure 20:
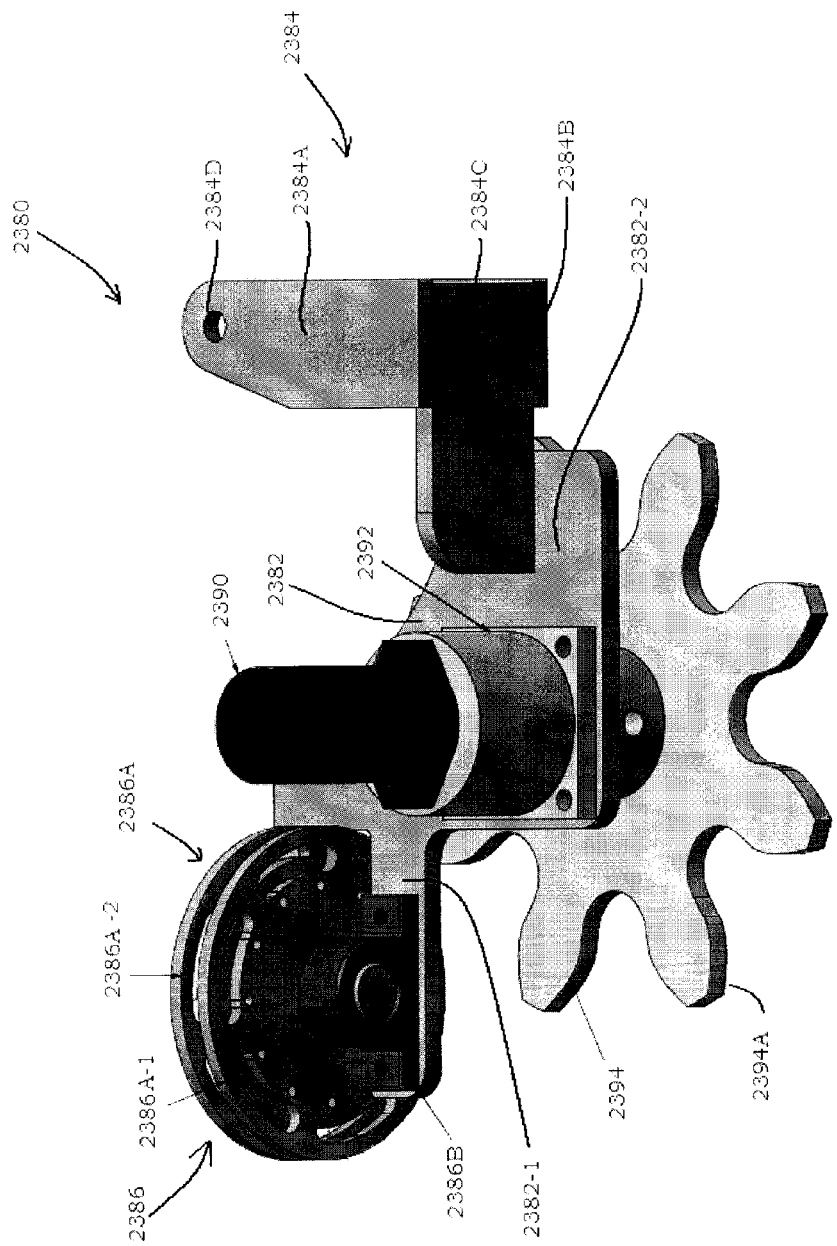
FIG. 20 is a view of a gear drive assembly in accordance with example embodiments.

Though not shown in FIG. 19, the drive motor arm 2368 may connect to a gear drive assembly 2380 (see FIG. 20). For example, the drive motor arm 2368 may include a bushing 2370 extending therethrough which may serve to facilitate a connection between the third connection assembly 2350 and the gear drive assembly 2380.

FIG. 20 is a view of an example gear drive assembly 2380 usable with example embodiments. In general, the gear drive assembly 2380, in accordance with example embodiments, may interface with the track 4000 via a guide member which may ride along the top of the track 4000 and a gear member which engages holes that may be formed along the track 4000. The sprocket type member may be operatively connected to a motor which may be mounted on the on the gear drive assembly 2380. The motor may, in turn, drive the sprocket type member thus causing the gear drive assembly 2380 to move along the track.

As indicated above, and referring to FIG. 20, the nonlimiting example gear drive assembly 2380 may include a motor which drives a gear, for example, a sprocket. In example embodiments, the gear drive assembly 2380 may include a drive motor mount 2384 which may be configured to attach to the drive motor arm 2368 of the third connection assembly 2350. In example embodiments, the drive motor mount 2384 may be comprised of three plates, a first plate 2384A, a second plate 2384B, and a third plate 2384C. In example embodiments, the first and second plates 2384A and 2384B may be substantially identical. For example each of the first and second plates 2384A and 2384B may include a hole (for example, hole 2384D shown with the first plate 2384A) through which a bolt may pass to connect the gear drive assembly 2380 to the drive motor arm 2368 of the third connection assembly 2350. For example, the first plate 2384A and the second plate 2384B may be arranged so that the hole 2384D of the first plate 2384A and the corresponding hole of the second plate 2384B are in line with the bushing 2370 of the third connection assembly 2350. In this configuration, a bolt may be passed through the hole 2384D of the first plate 2384A, the bushing 2370 of the third connection assembly 2350, and the aforementioned hole of the second plate 2384B. In example embodiments, the first and second plates 2384A and 2384B may be connected by the third plate 2384C which may connect to a mounting plate 2382 of the drive motor mount 2384. In example embodiments, the first and second plates 2384A and 2384B may be substantially horizontal plates and the third plate 2384C may be a substantially vertical plate as shown in FIG. 20, however, example embodiments are not limited thereto. For example, rather than forming the drive motor mount 2384 by joining together three separate plates, the drive motor mount may be formed as a single member cut from channel iron or tube steel.

In example embodiments, the gear drive assembly 2380 may include a mounting 2382 which includes a notched arm 2382-1 in which a guide wheel assembly 2386 may attach and a landing area 2382-2 to which the drive motor mount 2384 may attach. For example, the third plate 2384C of the drive motor mount 2384 may be welded to the landing area 2382-2 of the mounting plate 2382 to provide a rigid connection between the drive motor mount 2384 and the gear drive assembly 2380. Example embodiments, however, are not limited thereto. For example, the third plate 2384C may be fixed to the landing area 2382-2 via bolts arranged to form a moment connection. As another example, example embodiments are not limited to a gear drive assembly 2380 having a guide wheel assembly. For example, rather than having a guide wheel assembly 2386, a plate, for example, a U-shaped plate configured to ride along a top surface of the track 4000 may be attached to the mounting 2382. Further yet, the shapes of the various members, for example, the mounting 2382 is not intended to limit example embodiments as the mounting 2382 may have various other shapes.

Figure 21:
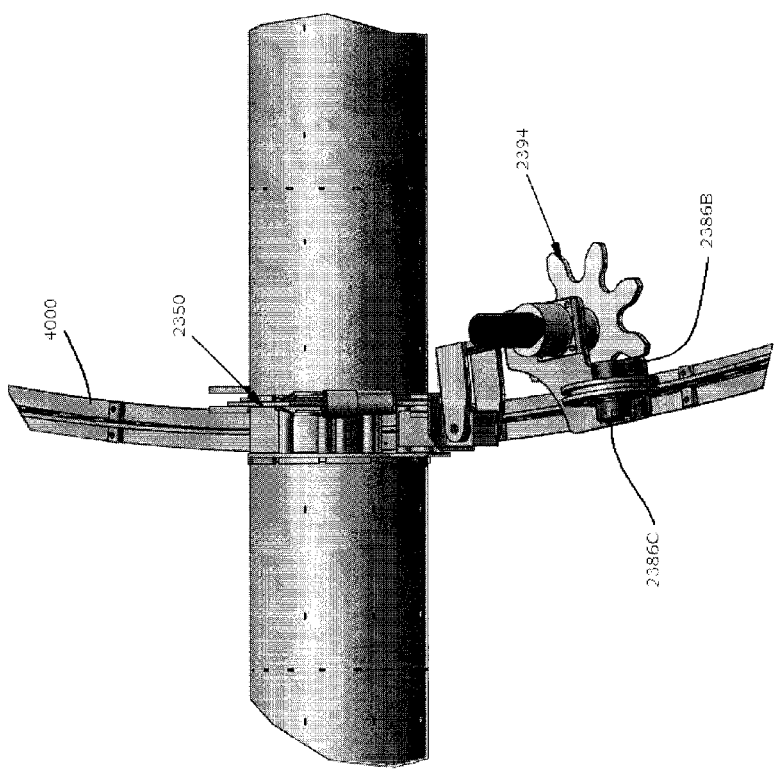
FIG. 21 is a view of the gear drive assembly interfacing with a track in accordance with example embodiments.

In example embodiments, the guide wheel assembly 2386 may include a wheel 2386A, a first mounting bearing 2386B, and a second mounting bearing 2386C (see FIG. 21). The first and second mounting bearings 2386B and 2386C may be welded or bolted to the mounting plate 2382 so that the wheel 2386A is supported so as to at least partially reside in a notch formed in the notched arm 2382-1. In example embodiments, the wheel 2386A may be a flanged wheel having a first flange 2386A-1 and a second flange 2386-2. The flanged portions provide a channel into which a portion of the track 4000 may be inserted.

In example embodiments, the mounting plate 2382 may have a hole arranged near a middle thereof. The mounting plate 2382 with the hole may allow for a first gear 2392, for example, an omni gear, to be fastened to the mounting plate 2382 by bolting or welding, and may also allot for a portion of the first gear 2392 to pass through the mounting plate 2382. In example embodiments, the first gear 2392 may connect to a second gear 2394, for example, a sprocket, which includes teeth 2394A configured to engage the track 4000. The first gear 2392 may also be connected to a motor 2390, for example, a hydraulic motor, which may operatively cause the second gear 2394 to rotate (via the first gear 2392). In example embodiments, the gear drive assembly 2380 may serves as a nonlimiting example of the first driving mechanism 5000 illustrated in FIG. 3. The gear drive assembly 2380 may also serve as a nonlimiting example of the second driving mechanism 6000 illustrated in FIG. 3.

FIG. 21 is a view of the gear drive assembly 2380 connected to the connection assembly 2350 and interfacing with the track 4000. As shown in FIG. 21, the wheel 2386 of the gear drive assembly 2380 may fit over a portion of a vertical member of the track 4000 while the teeth 2394A of the second gear engage various holes in the vertical member of the track 4000. Although it should be obvious to one skilled in the art, the following is pointed out for clarity. As the motor 2390 operates, various structures in the first gear 2392 operate to rotate the second gear 2394. As the second gear 2394 rotates, the teeth 2394A of the second gear 2394 rotate into and out of various holes formed in the track 4000. Thus, operation of the motor 2390 may cause the arm 2000 of the bin sweep 100 to which it is attached, for example, the second arm 2000 of the bin sweep 100, to rotate about the sweep swivel 1200.

Figure 22A:
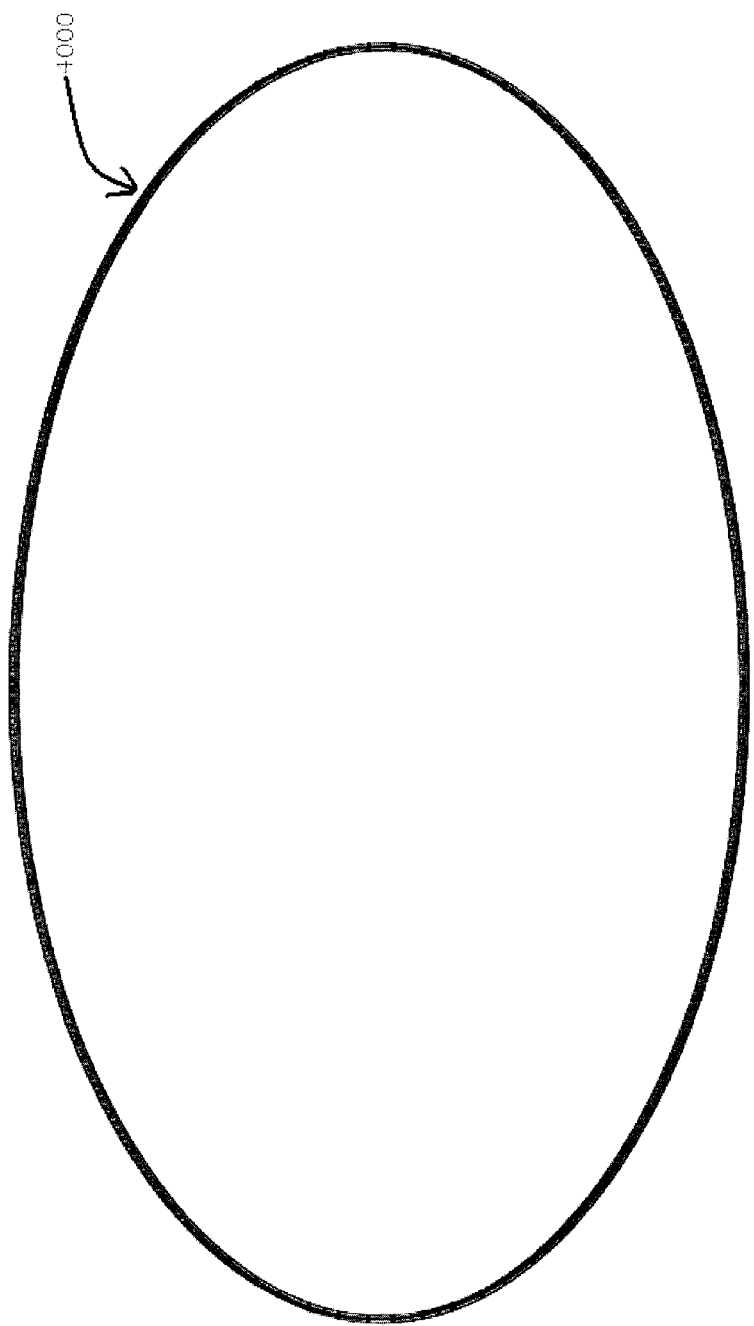
FIG. 22A-22B are views of a track in accordance with example embodiments.
Figure 22B:
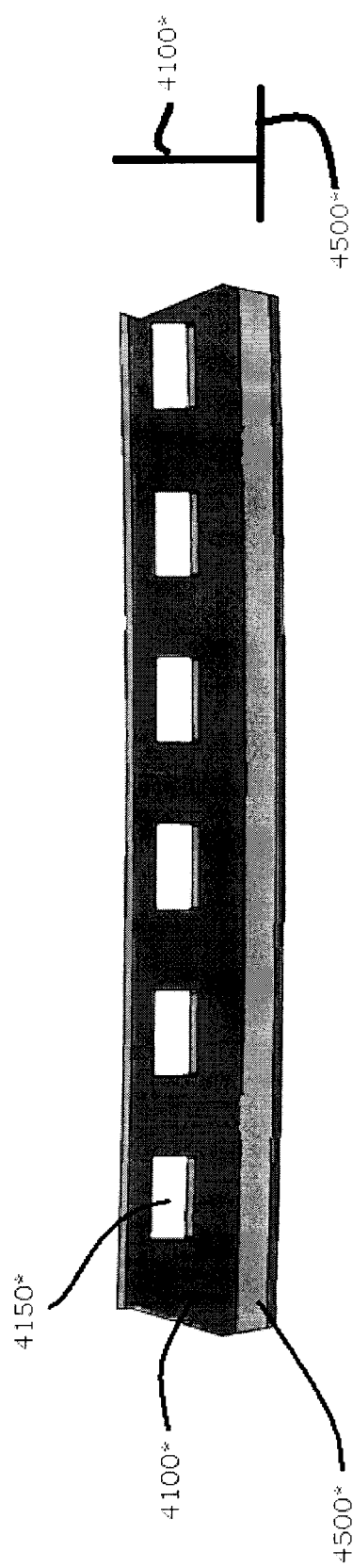

FIG. 22A is a view of the track 4000 in accordance with example embodiments. As shown in FIG. 22, the track 4000 may be a substantially circular track which may be provided as one entire piece or provided in different sections. FIG. 22B illustrates a portion of the track that may be provided as one large diameter piece. As shown in FIG. 22B, the track 4000 may have a T-type cross-section, that is, a cross section having a vertical component 4100\* and a horizontal component 4500\*. In example embodiments, the vertical component 4100\* may include a plurality of holes 4150\* arranged around a perimeter of the track 4000. The plurality of holes 4150\* may be configured to interact with the teeth 2394A of the gear drive assembly 2380.

Figure 23:
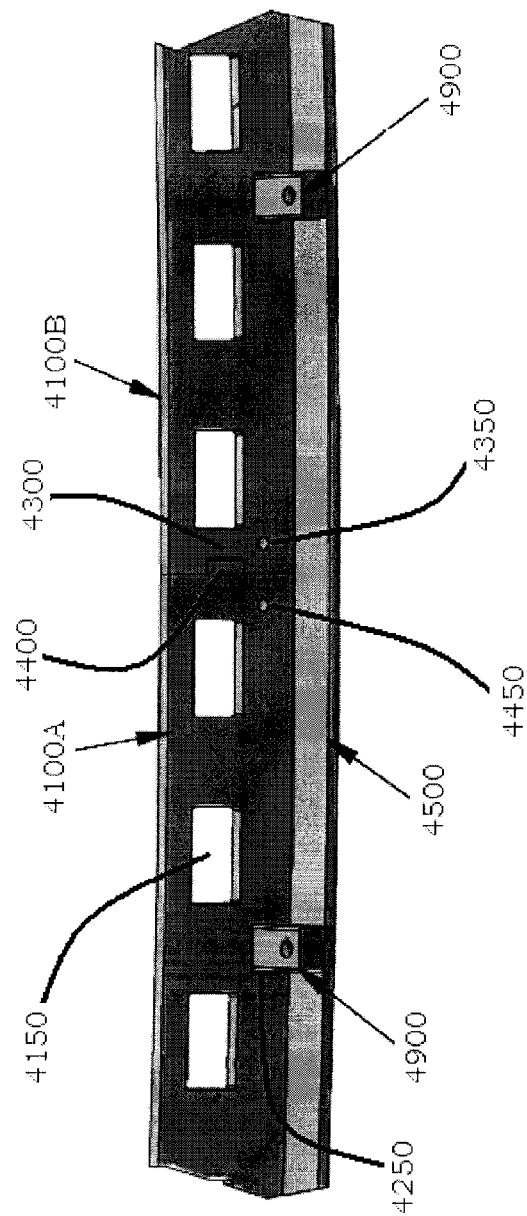
FIG. 23 is a view of a track in accordance with example embodiments.

Although the track 4000 may be provided as one member, example embodiments are not limited thereto. For example, the track 4000 may be provided in several sections that may interlock with each other. For example, FIG. 23 illustrates a section of the track 4000 when the track 4000 is formed of the several interlocking members. In example embodiments, the interlocking members may include a first curved plate 4100, a second curved plate 4500, and connecting blocks 4900.

Figure 24A:
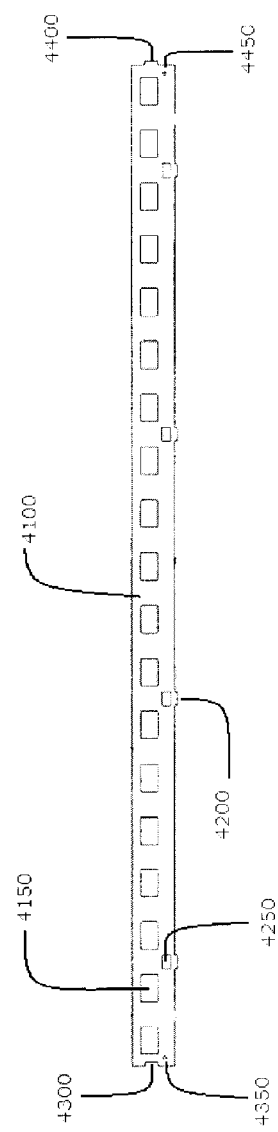
FIGS. 24A and B are views of a curved member of a track in accordance with example embodiments.
Figure 24B:
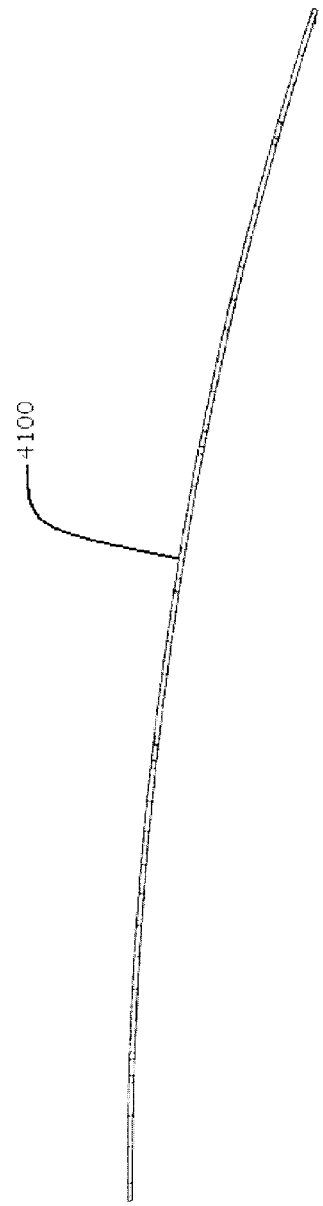

FIG. 24A is a view of the first curved plate 4100 usable for constructing the track 4000 of example embodiments and FIG. 24B is a top view of the first curved plate. As shown in FIG. 24A, the first curved plate 4100 may include a plurality of holes 4150 configured to interface with the teeth 2394A of the gear drive assembly 2380. For example, in FIG. 24A, the first curved plate may include nineteen holes 4150 configured to interface with the teeth 2394A of the gear drive assembly 2380. The holes 4150 may be substantially identical with one another and may be substantially evenly spaced along a length of the first curved member 4150. A first end of the first curved plate 4100 may include a notch 4300 which may be configured to engage a tab of an adjacent curved member. Near the notch 4300 is a hole 4350 to which a connecting plate (not shown) may be attached.

In example embodiments, a bottom side of the first curved plate 4100 may include a plurality of tabs 4200 which may be configured to interface with a plurality of notches or holes that may be formed in the second curved plate 4500 (to be explained later). In example embodiments, a plurality of holes 4250 may be provided above the tabs 4250. The plurality of holes 4250 may be configured to allow the connecting block 4900 to pass therethrough so that the first curved plate 4100 may be attached to the second curved plate 4500. In example embodiments, a second end of the first curved plate 4100 may include a tab 4400 which may be configured to engage a notch in an adjacent curved plate.

Figure 25A:
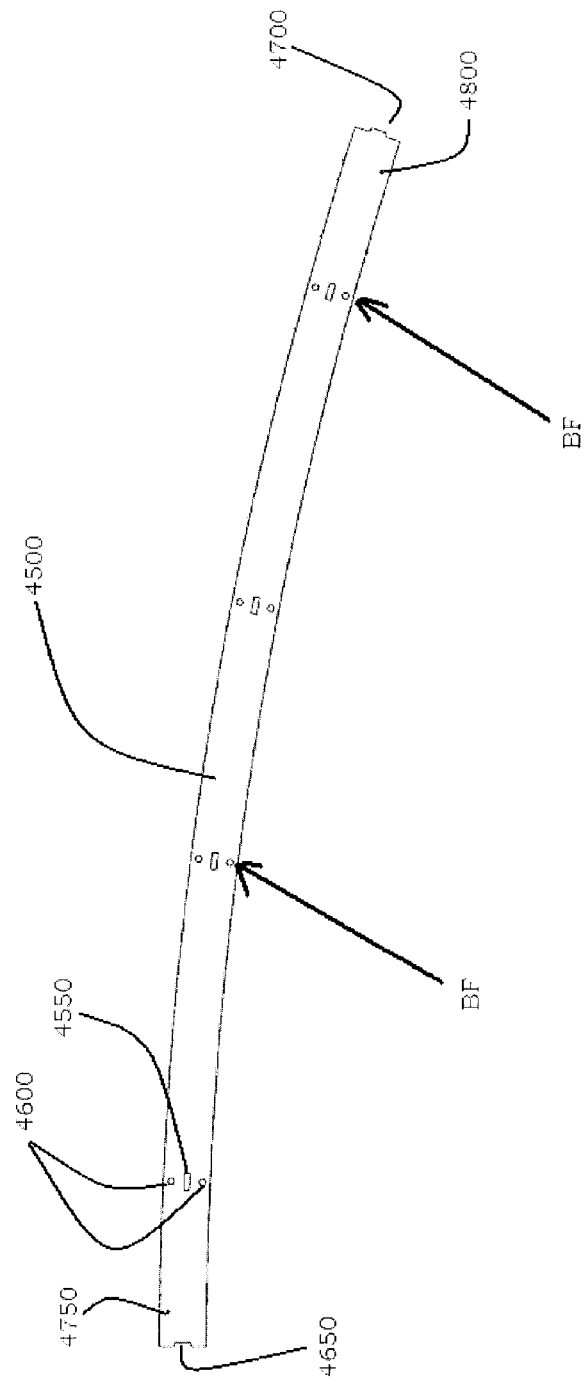
FIGS. 25A and 25B are views of a curved member of a track in accordance with example embodiments.

FIG. 25A is a view of the second curved plate 4500 that may be used to form part of the track 4000. In example embodiments, the second curved plate 4500 may be substantially flat and may be mounted on the floor of a bin, for example, a grain bin. In example embodiments, the second curved plate 4500 may include a notch 4650 formed at one side thereof. In example embodiments, the notch 4650 may be configured to engage a tab of an adjacent curved plate. In example embodiments a tab 4700 may be provided at a second side of the second curved member 4800. The tab 4700 may be configured to engage a notch of an adjacent curved plate. In example embodiments, the second curved plate 4500 may include a plurality of notches or holes 4550 formed along a length of the second curved plate 4500. The plurality of notches or holes 4550 may be configured to engage the plurality of tabs 4200 that may be formed along a bottom edge of the first curved plate 4100. In example embodiments, a couple of holes 4600 may be provided near each of notches or holes 4550 as shown in FIG. 25. The holes 4600 may allow for the connecting block 4900 to secure the first curved plate 4100 to the second curved plate 4500. In addition, the holes 4600 may be internally threaded so that they can interface with external threads that may be formed on the outside of a bolt or screw.

In example embodiments, several of the holes 4600 may be used to bolt the second curved plate 4500 to a floor, for example, a floor of a grain bin. In example embodiments, for example, every other hole BF may be used to secure the second curved plate 4500 to the floor.

Figure 25B:
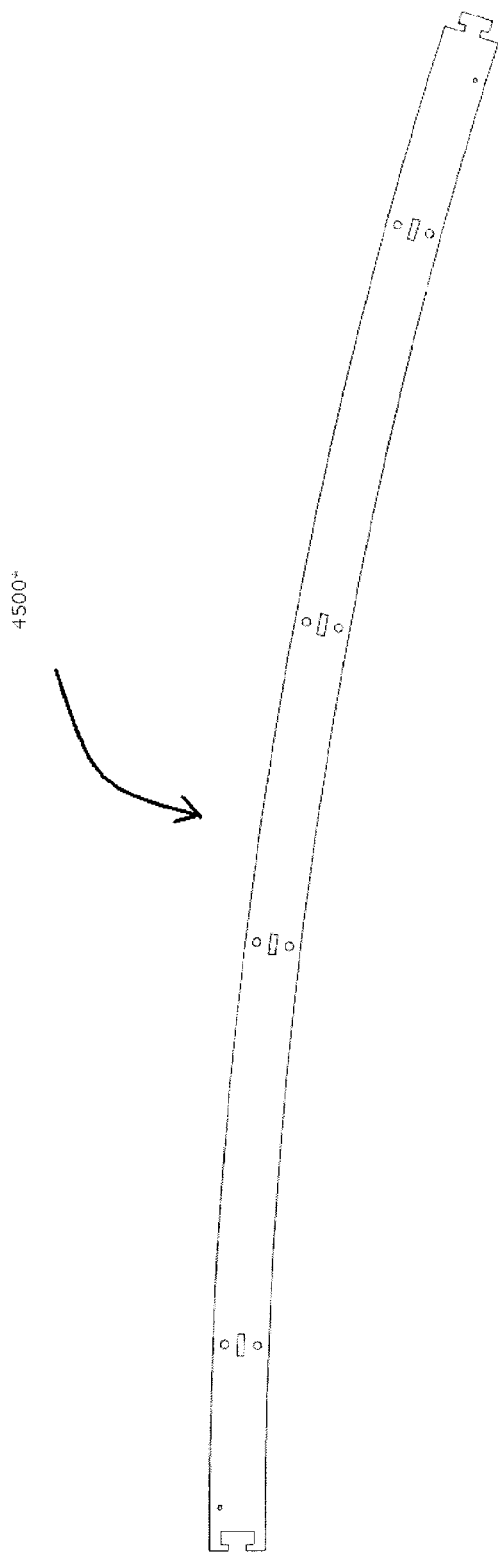

FIG. 25B is another example of a second curved plate 4500* which is usable with example embodiments. The second curved plate 4500* of FIG. 25B may be substantially similar to the second curved plate 4500 of FIG. 25A except that the ends of the second curved plate 4500* may be designed for interlocking to an adjacent second curved plate 4500*.

In example embodiments the first and second curved plates 4100, 4500, and 4500* may be fabricated from plate steel using a laser cutting process. Thus, from a geometric standpoint, the track according to example embodiments is superior to conventional tracks which are formed through a bending process (which tends to produce bent members having an irregular shape). Thus, the track 4000 according to example embodiments represents a novel and nonobvious track with superior geometry.

Figure 26A:
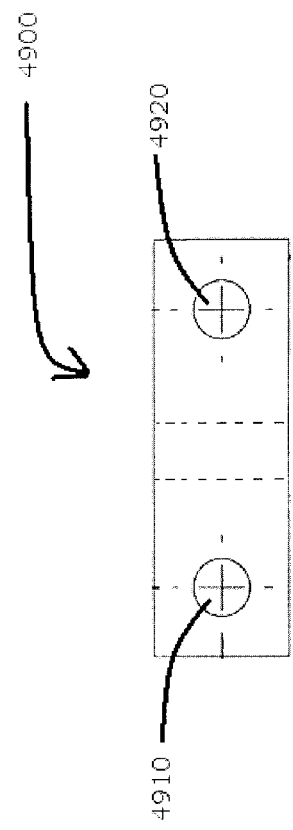
FIGS. 26A and B is a view of a connecting block in accordance with example embodiments.
Figure 26B:
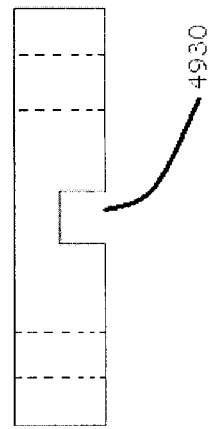

FIGS. 26A and 26B illustrate an example of the connecting block 4900 which may be used to connect the first curved plate 4100 to the second curved plate 4500. In example embodiments, the connecting block 4900 may include a first hole 4910 and a second hole 4920 that may penetrate the connecting block 4900. The first and second holes 4910 may have the same spacing as the couple of holes 4600 illustrated in FIG. 25. In example embodiments, the connecting block 4900 may be inserted into one of the plurality of holes 4250 and may be secured to the second curved plate 4500 by passing bolts or screws through the first and second holes 4910 and 4920 and into the pair of holes 4600 formed in the second curved plate 4500.

FIG. 23 is a partial view of the track 4000 using the curved plates 4100 and 4500 with the end tabs and notches 4400 and 4300 interfacing with one another. In addition, FIG. 23 shows the first curved plates 4100 secured to a second curved plate 4500 by the connecting blocks 4900.

As mentioned earlier, the arms 2000 and 3000 may be comprised of various sections (for example sections 2100, 2200, 2300, 2400, 2500, 3100, 3200, 3300, 3400, and 3500) which may support material moving devices, such as augers. In FIGS. 3 and 4, for example, the material moving device is represented as an auger 3050. In example embodiments, ends of the augers 3050 may be supported by auger bearings that may, in turn, be supported by the connection assemblies that connect the various sections together. For example, an auger associated with the second section 2200 of the first arm 2000 may be supported by auger bearings of the first connection assembly 2150 and the second connection assembly 2250, the auger associated with the third section 2300 of the first arm 2000 may be supported by the auger bearings of the second connection assembly 2250 and the third connection assembly 2350, the auger associated with the fourth section 2400 of the first arm 2000 may be supported by the auger bearings of the third connection assembly 2350 and the fourth connection assembly 2450, and the auger associated with the fifth section 2500 of the first arm 2000 may be supported by the auger bearings of the fourth connection assembly 2450 and the fifth connection assembly 2550. Similarly, an auger associated with the second section 3200 of the second arm 3000 may be supported by auger bearings of the sixth connection assembly 3150 and the seventh connection assembly 3250, the auger associated with the third section 3300 of the second arm 3000 may be supported by the auger bearings of the seventh connection assembly 3250 and the eighth connection assembly 3350, the auger associated with the fourth section 3400 of the second arm 3000 may be supported by the auger bearings of the eighth connection assembly 3350 and the ninth connection assembly 3450, and the auger associated with the fifth section 3500 of the second arm 3000 may be supported by the auger bearings of the ninth connection assembly 3450 and the tenth connection assembly 3550.

Figure 27:
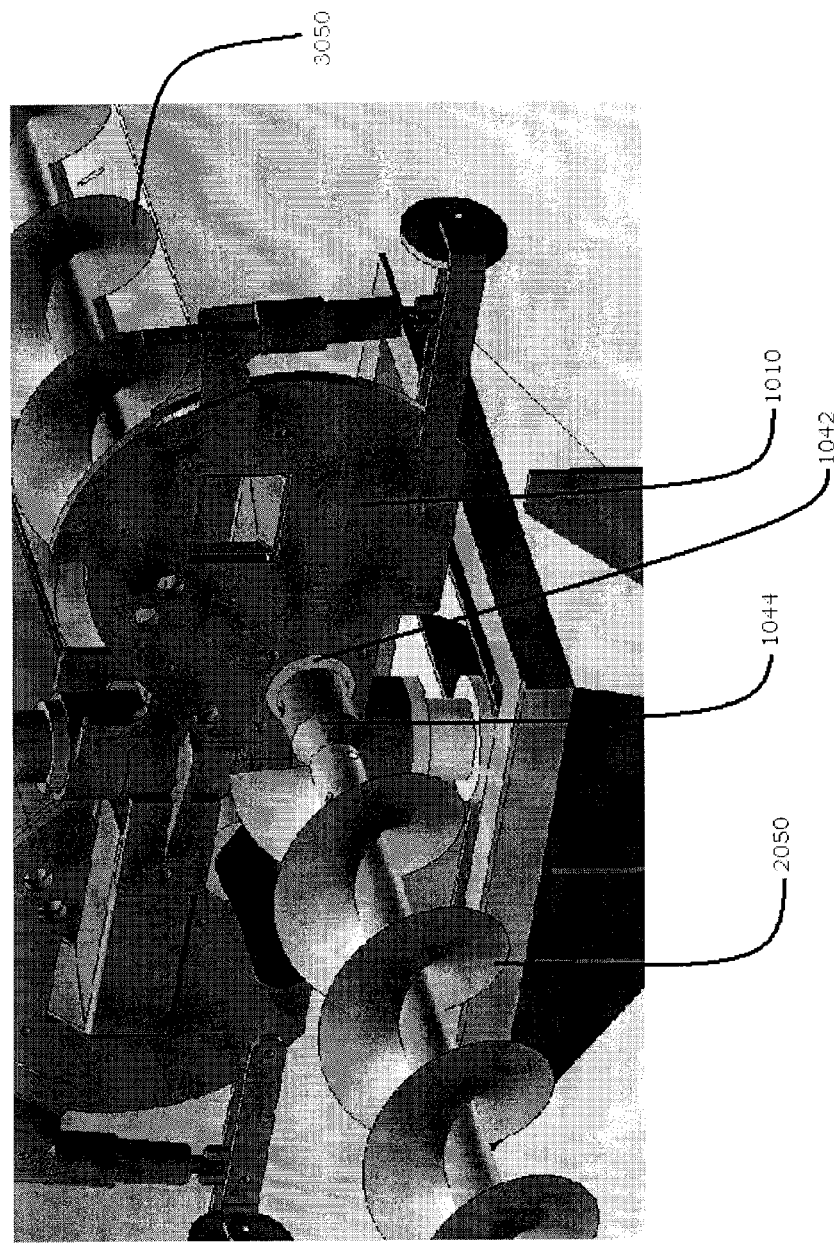
FIG. 27 is a view of a sweep pivot assembly with an auger attached in accordance with example embodiments.

In example embodiments, each of the first sections 2100 and 3100 of the first and second arms 2000 and 3000 may include an auger. These augers (which may be referred to as starting augers) may connect to motors, for example, hydraulic motors, which may be attached to the sweep pivot assembly 1000. For example, referring to FIGS. 5 and 27, a first starting auger 2050 may be attached to a first motor 1040 that may, in turn, be attached to the sweep pivot assembly 1000 via a first gear box 1042. Similarly, a second starting auger 3050 may be attached to a second motor 1140 that may, in turn, be attached to the sweep pivot assembly 1000 via a second gear box 1142. In example embodiments, the first starting auger 2050 may attach to the first gear box 1042 via a coupler 1044. In example embodiments, each of the first starting auger 2050 and the coupler 1044 which may include holes allowing for the first starting auger 2050 to be connected to the coupler 1042 by a pin or a bolt. In example embodiments, the second starting auger 3050 may be connected to the second motor 1040 by similar structures. Example embodiments, however, are not limited thereto as other connecting methods, such as welding or clamping, may be used in lieu of the presented pin connecting method.

In example embodiments, each of the augers associated with each of the sections in the first arm 2000 may be connected to each other, for example, by a pin connection, a screw connection, and/or a rigid connection (for example, welding). Thus, as the first starting auger 2050 operates (for example, by turning due to operation of the first motor 1040), all of the other augers in all of the other sections of the first arm 2000 would likewise operate (for example turn). Similarly, each of the augers associated with each of the sections in the second arm 3000 may be connected to each other, for example, by a pin connection, a screw connection, or a rigid connection (for example, welding). Thus, as the second starting auger 3050 operates (for example, by turning due to operation of the second motor 1140), all of the other augers in all of the other sections of the second arm 3000 would likewise operate (for example turn).

Referring back to FIG. 6, it is noted that the first connecting member 1010 may include a relatively large hole 1044 around which smaller holes 1044 and 1046 may be provided. The relatively large hole 1044 may provide an opening through which components of the gear box 1042 may pass and the smaller holes may provide holes for mounting the gear box 1042 to the first connecting member 1010. The gear box 1042 may be configured to connect to the starting auger 2050 that may be in the first section 2100 of the first arm 2000. In example embodiments, a first motor 1042 may be attached to the gear box 1042 to drive the gears in the gear box 1042 which in turn drives the starting auger 2050 in the first section 2100. Though not shown in the figures, it is understood that the second connecting member 1110 may also include a hole through which the second gear box 1142 (see FIG. 5) may be inserted. The second gear box 1142 may be connected to the second starting auger 3050 in the first section 3100 of the second arm 3000.

In example embodiments, the first motor 1042, the second motor 1142, and the motors 2390 of the first and second driving mechanisms 5000 and 6000 may be controlled by a control device. In example embodiments, the control device may be configured to operate the motors 2390 of the first and second driving mechanisms 5000 and 6000 to move in a manner that is dependent on variable associated the bin sweep 100. For example, the control device may be configured to operate the first driving mechanism 5000 to move in a first direction when the variable is within a first range and stop when the variable is within a second range. In example embodiments, the control device may be further configured to cause the second driving mechanism 5000 to reverse direction when the variable is within a third range. Similarly, the control device may be configured to operate the second driving mechanism 6000 to move in a third direction when the variable is within the first range and stop when the variable is within the second range.

As alluded to earlier, each of the first motor 1042, the second motor 1142, and the motors 2390 of the first and second driving mechanisms 5000 and 6000 may be hydraulic motors. Also, as outlined above, operations of each of first motor 1042, the second motor 1142, and the motors 2390 of the first and second driving mechanisms 5000 and 6000 may be controlled by a control device. In example embodiments, the control device may be a valve.

Figure 28:
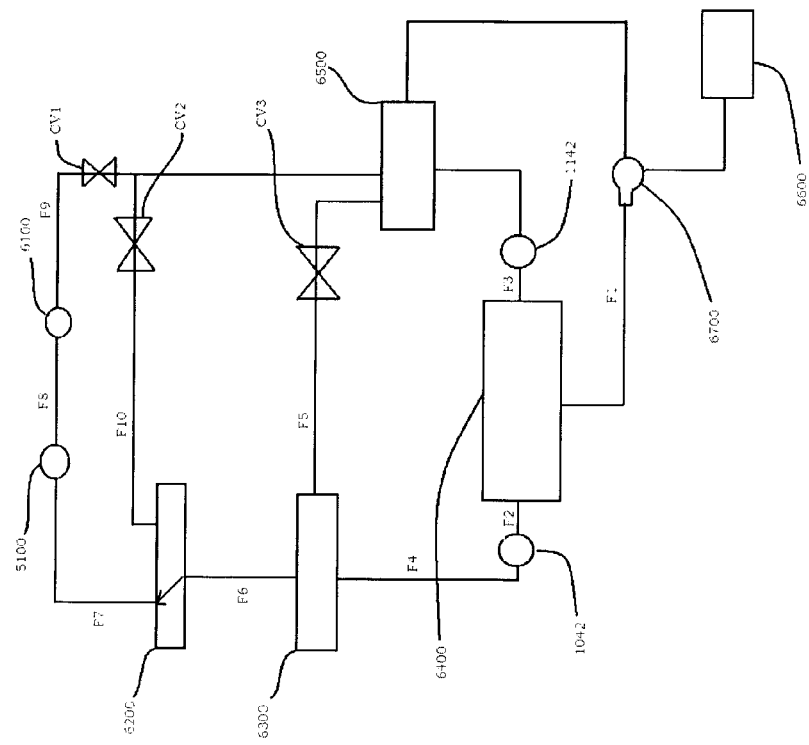
FIG. 28 is a schematic of a flow diagram in accordance with example embodiments.

For simplicity, the motor 2390 of the first driving mechanism 5000 will be noted as the first drive motor 5100 and the motor 2390 of the second driving mechanism 6000 will be noted as the second drive motor 6100 as illustrated in FIG. 28.

FIG. 28 represents a flow diagram in accordance with example embodiments. As shown in FIG. 28, a pump 6700 may be configured to provide a first flow of fluid F1, for example, hydraulic fluid, to a first flow divider 6400. In example embodiments, the first flow divider 6400 may divide the first flow of fluid F1 into a second flow of fluid F2 and a third flow of fluid F3. In example embodiments the third flow of fluid F3 may be fed to the second motor 1140 to operate the second motor 1140 and the second flow of fluid F2 may be fed to the first motor 1040 to operate the first motor 1140. Thus, the first and second motors 1040 and 1140 may operate under the influence of the pump 6700. In example embodiments the first motor is connected to the starting auger of the first section 2100, thus, operating the first motor 1040 also operates the starting auger of the first section 2100 and its linked augers. Similarly, operating the second motor 1140 also operates the starting auger of the first section 3100, thus operating the second motor 1140 also operates the starting auger in the first section 3100 and its linked augers.

In example embodiments, the first flow divider 6400 may be configured to evenly divide the first flow of fluid F1. For example, if the first flow of fluid F1 is 40 GPM, the second and third flows of fluid may be about 20 GPM. Example embodiments, however, are not limited thereto as the first flow divider 6400 may alternatively be configured to unevenly divide the first fluid flow F1.

In example embodiments, the third flow of fluid F3 may pass through the second motor 1140 and to a tank 6500 as shown in FIG. 28. The second flow of fluid F2, on the other hand, may pass to the first motor 1040 to form a fourth flow of fluid F4. The fourth flow of fluid F4 may enter a second flow divider 6300 which may divide the fourth flow of fluid F4 into a fifth and sixth flow of fluid F5 and F6. In example embodiments, the fifth and sixth flow of fluid F5 and F6 may not be even. For example, in the event the fourth flow of fluid F4 is 20 GPM, the fifth flow of fluid may be 18 GPM whereas the sixth flow of fluid is 2 GPM. In example embodiments, the fifth flow of fluid F5 may be fed to the tank 6500 whereas the sixth flow of fluid may be sent to a piloted directional valve 6200.

In example embodiments, the piloted directional valve 6200 may have a set pressure. For example, the set pressure may be about 2000 psi. In example embodiments, if the pressure of the sixth flow of fluid F6 is below the set pressure, the sixth flow of fluid F6 may flow out the piloted directional valve 6200 to form a seventh flow of fluid F7 which is directed towards the first drive motor 5100. The seventh flow of fluid 5100 may enter the first drive motor 5100 to operate the first drive motor 5100 and then may exit the first drive motor 5100 to form an eighth flow of fluid F8. The eighth flow of fluid F8 may travel to second drive motor 6100 to operate the second drive motor 6100. The eighth flow of fluid F8 may exit the second drive motor 6100 to form a nineth flow of fluid F9 which may be directed to the tank 6500. Thus, in example embodiments, if the pressure of the fluid entering the piloted directional valve 6200 is less than the piloted directional valve's 6022's set pressure, fluid may pass through the first and second motors 5100 and 6100 to operate the first and second driving mechanisms 5000 and 6000.

In the event the pressure of the sixth flow of fluid F6 is higher than the piloted directional valve's 6022's set pressure, the fluid F6 leaves the piloted directional valve 6200 to form a tenth fluid flow F10. The tenth fluid flow F10 may be directed to the tank 6500. Thus, in the event the pressure of the sixth flow of fluid F6 is higher than the piloted directional valve's 6022's set pressure, fluid is not sent to the first and second motors 5100 and 6100 and thus the first and second motors 5100 and 6100 will not operate thus causing the first and second driving mechanisms 5000 and 6000 to stop.

In example embodiments, each of the fluid flows F1, F2, F3, F4, F5, F6, F7, F8, F9, and F10 may flow through structural members such as tubes or pipes. Furthermore, the tubes or pipes may include intermediate members such as couplers or valves. For example, a pipe or tube through which the fifth flow F5 flows may include a one-way valve CV3, for example, a check valve, to ensure fluid does not flow from the tank 6500 to the second flow divider 6300. Similarly, the tube or pipe through which the tenth flow F10 flows may also include a one-way valve CV2 to make sure fluid does not flow from the second drive motor 6100 to the piloted directional valve 6200. Similarly, the tube or pipe through which the ninth flow F9 flows may include a one-way valve CV1 to prevent fluid flowing from either the piloted directional valve 6200 or the tank 6500 to the second drive motor 6100.

In example embodiments, the first flow divider 6400, the second flow divider 6300 and the first piloted directional valve 6200 may constitute a control device which may control the first motor 1040, the second motor 1140, the first drive motor 5100 and the second drive motor 6100. For example, depending on the pressure of the fluid flowing through the system, the first and second drive motors 5100 and 6100 may or may not operate. Although the first flow divider 6400, the second flow divider 6300 and the first piloted directional valve 6200 are illustrated as separate structures, these elements may be combined into a single compact valve.

In addition to the above elements, the system of FIG. 28 also includes a bin indicator 6600 which may sense a level of material, for example, grain, sand, or coal, that may be moved by the bin sweep 100. In example embodiments, the amount material moved by the bin sweep 100 may be dependent on the amount of fluid being pumped through the pump 6700. Thus, in the event the bin indicator 6600 indicates that an amount of material moved by the bin sweep is too high, for example, by comparing the amount of material moved to an allowable value of material moved, the bin indicator 6600 may control the pump 6700 to reduce the amount of fluid it is pumping to reduce the speed of the bin sweep and reduce the rate at which material is being moved by the bin sweep 100.

Figure 29:
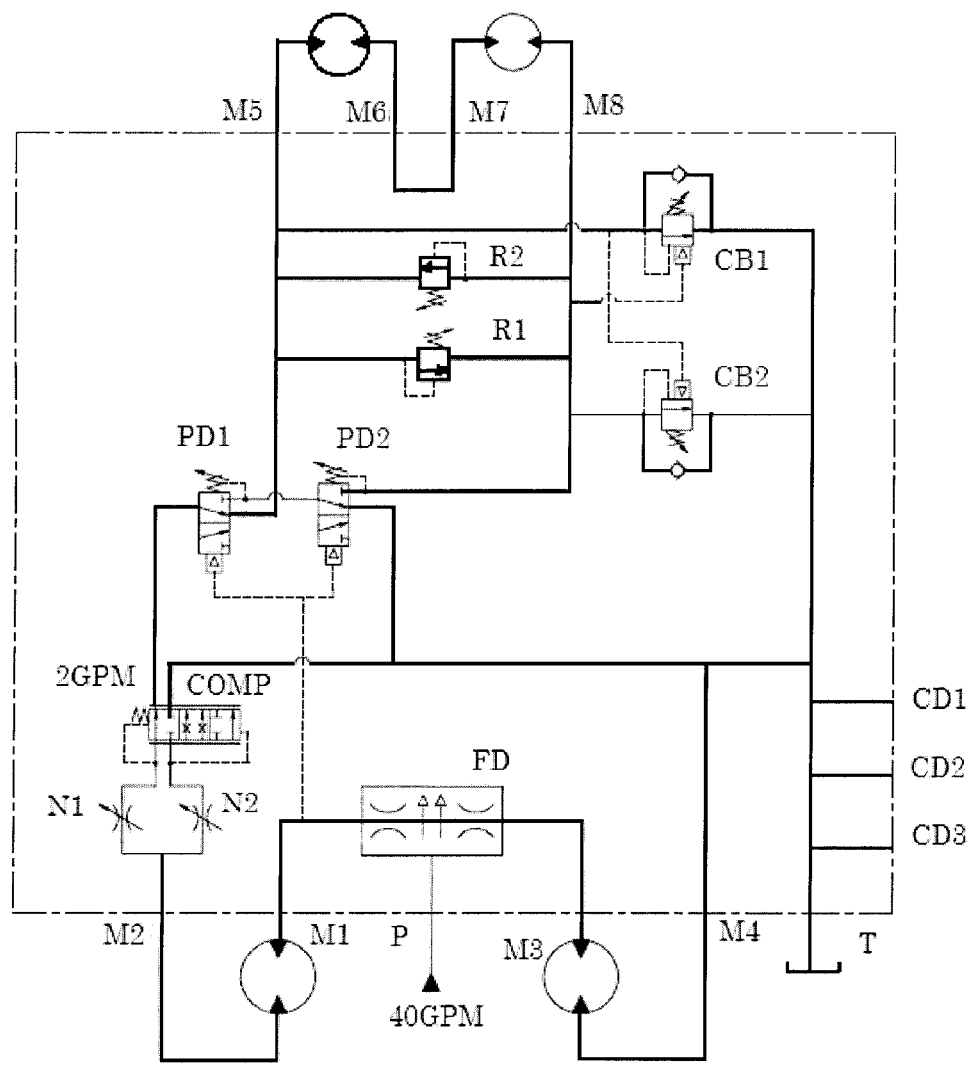
FIG. 29 is a schematic of a flow diagram in accordance with example embodiments.

FIG. 29 presents an alternate control system/device, in accordance with example embodiments. In FIG. 29, the first motor 1042, the second motor 1142, and the motors 2390 of the first and second driving mechanisms 5000 and 6000 may be controlled by another control device. In FIG. 29, the control device may be configured to operate the motors 2390 of the first and second driving mechanisms 5000 and 6000 to move in a manner that is dependent on a variable associated the bin sweep 100. Like the embodiment of FIG. 28, the non-limiting example of a control device according to FIG. 29 may be configured to operate the first driving mechanism 5000 to move in a first direction when the variable is within a first range and stop when the variable is within a second range. In FIG. 29, however, the control device may be further configured to cause the first driving mechanism 5000 to reverse direction when the variable is within a third range. Similarly, the control device may be configured to operate the second driving mechanism 6000 to move in a third direction when the variable is within the first range and stop when the variable is within the second range. Similar yet, the control device may be further configured to reverse a direction of the second driving mechanism 6000 when the variable is within the third range. For example, in example embodiments, the motors 2390 of the first and second moving mechanisms 5000 and 6000 may be hydraulic motors, for example, reversible hydraulic motors, and the variable may be a pressure associated with a hydraulic fluid that is fed to the motor 2390 of the first moving mechanism 5000 and/or a pressure of a hydraulic fluid that is fed to the motor 2390 of the second moving mechanism 6000.

As alluded to earlier, each of the first motor 1042, the second motor 1142, and the motors 2390 of the first and second driving mechanisms 5000 and 6000 may be hydraulic motors. Also, as outlined above, operations of each of first motor 1042, the second motor 1142, and the motors 2390 of the first and second driving mechanisms 5000 and 6000 may be controlled by a control device. In example embodiments, the control device may be a valve.

As in FIG. 28, the motor 2390 of the first driving mechanism 5000 will be noted as the first drive motor 5100 and the motor 2390 of the second driving mechanism 6000 will be noted as the second drive motor 6100.

FIG. 29 provides an example of a flow diagram which illustrates a hydraulic fluid flow through the bin sweep 100 according to example embodiments. Although FIG. 29 provides an example of a flow diagram which is usable with example embodiments, the invention is not limited thereto as alternative flow diagrams may be employed to operate and control each of the first motor 1042, the second motor 1142, and the motors 2390 of the first and second driving mechanisms 5000 and 6000.

Referring to FIG. 29 a flow of hydraulic fluid may be provided to a flow divider FD which may divide the hydraulic fluid flow into a first flow M1 and a second flow M3. For example, 40 GPM of hydraulic fluid may be provided to the flow divider FD and the flow divider FD may divide the flow into two 20 GPM flows M1 and M3. Although example embodiments provide an example in which the input hydraulic fluid is equally divided into a first flow M1 and a second flow M3, example embodiments are not limited thereto as the divider may be configured to divide the flow unequally.

In example embodiments, the first flow M1 of hydraulic fluid may be provided to the first motor 1042 and the second flow M3 of hydraulic fluid may be provided to the second motor 1142. In example embodiments, the first flow M1 may cause the first motor 1042 to operate thus causing the first starting auger 2050 and its linked augers to turn. Similarly, the second flow M2 may cause the second motor 1142 to operate thus causing the second starting auger 3050 and its linked augers to turn. In example embodiments, because the flow of hydraulic fluid to each of the first and second motors 1042 and 1142 may be the same, and because the first and second motors 1042 and 1142 may be substantially the same, the first and second starting augers 2050 and 3050 may rotate at substantially the same rate.

In example embodiments, the second flow of hydraulic fluid M3 may exit a port of the second motor 1142 as a third flow of hydraulic fluid M4. In example embodiments the third flow of hydraulic fluid M4 may be fed to a tank T as shown in FIG. 29. Similarly, the second flow of hydraulic fluid M3 may leave the first motor 1042 as a fourth flow of hydraulic fluid M2. However, rather than flowing the fourth flow of hydraulic fluid M2 to the tank T, the fourth flow of hydraulic fluid M2 may be fed to a compensator COMP. The compensator COMP allows a portion of the fourth flow of hydraulic fluid M2 to flow to the drive motors 5100 and 6100 which may be run in series. For example, the compensator COMP may allow 2 GPM of hydraulic fluid to flow to the drive motors 5100 and 6100 and may allow the remainder, for example, 18 GPM, to return to the tank T.

Prior to entering the compensator COMP, the fourth flow of hydraulic fluid M2 may be pass through a first needle valve N1 and a second needle valve N2. The first needle valve N1 may be configured to serve as a speed adjustment for the drive motors 5100 and 6100 and the second needle valve N2 may provide backpressure on the compensator COMP. This allows the drive motors 5100 and 6100 to speed up or slow down with the augers, for example, the starting augers 2050 and 3050.

In example embodiments, the flow of hydraulic fluid leaving the compensator COMP is fed to a pair of piloted directional valves PD1 and PD2. The piloted directional valves PD1 and PD2 allow the drive motors 5100 and 6100 to stop and even reverse direction. In example embodiments, the first piloted directional valve PD1 may be configured to adjust the stop feature whereas the second piloted directional valve PD2 may be configured to reverse the direction of the drive motors 5100 and 6100. In example embodiments, the first piloted directional valve PD1 may be set at a lower pressure than the second piloted directional valve PD2. For example, the first piloted directional valve PD1 may be set at a pressure of 2000 psi whereas the second piloted directional valve PD2 may be set at a pressure of 2200 psi. In example embodiments, the pressure setting represents the pressure that is required to drive the augers. If an overload condition occurs the drive motors 5100 and 6100 will first stop and then may reverse (if the overload condition exceeds the set pressure of PD2) until the pressure drops below 2000 psi.

In example embodiments, when the pressure of the hydraulic fluid entering the first piloted directional valve PD1 is less than its set pressure (an example of a first range), the hydraulic fluid leaving the first piloted directional valve PD1 may form a fifth fluid flow M5 which may be flowed to the first drive motor 5100. In example embodiments, the fifth fluid flow M5 may enter a port of the first drive motor 5100 to drive the first drive motor 5100 thus causing the first driving mechanism 5000 to travel along the track 4000. The hydraulic fluid may then exit a port of the first drive motor 5100 to form a sixth hydraulic fluid flow M6 and a seventh hydraulic fluid flow M7. In example embodiments, the seventh hydraulic fluid flow M7 may enter a port of the second drive motor 6100 to operate the second drive motor 6100 thus causing the second driving mechanism 6000 to travel along the track 4000. In example embodiments, the seventh hydraulic fluid flow M7 may leave a port of the second drive motor 6100 to form an eighth hydraulic fluid flow M8.

In example embodiments, when the pressure of the hydraulic fluid entering the first piloted directional valve PD1 is greater than the set pressure of the second piloted directional valve PD2 (an example of a third range), the hydraulic fluid leaving the first piloted directional valve PD1 may pass through the second piloted directional valve PD2 to form a fifth fluid flow M8 which may be flowed to the second drive motor 6100. In example embodiments, the fifth fluid flow M8 may enter a port of the second drive motor 6100 to reverse-drive the second drive motor 6100 thus causing the first driving mechanism 6000 to reverse-travel along the track 4000. The hydraulic fluid may then exit a port of the second drive motor 6100 to form a sixth hydraulic fluid flow M7 and a seventh hydraulic fluid flow M6. In example embodiments, the seventh hydraulic fluid flow M6 may enter a port of the first drive motor 5100 to operate the first drive motor 5100 thus causing the first driving mechanism 5000 to reverse-travel along the track 4000. In example embodiments, the seventh hydraulic fluid flow M6 may leave a port of the first drive motor 5100 to form an eighth hydraulic fluid flow M5.

In example embodiments, pressure relief valves R1 and R2 may be provided to control the maximum amount of power to the drive motors 5100 and 6100. As one skilled in the art would recognize, the arrows represent that the relief valves R1 and R2 are cross port reliefs where the flow is directed to the return side of the motors 5100 and 6100. In example embodiments, R1 may be configured to adjust the forward pressure and R2 may be configured to adjust the return pressure. In example embodiments the pressure relieve valves may be set at a suitable set pressure, for example, 400 psi. Example embodiments, however, are not limited to a set pressure of 400 psi. For example, the set pressure may be greater or less than 400 psi.

In example embodiments, counter balance valves CB1 and CB2 may be provided to allow a return flow path for the drive motors 5100 and 6100. In FIG. 28 case drain ports CD1, CD2, and CD3 may be provided for motors (not shown) that may not be used in the instant system.

In example embodiments each of the flow divider FD, the needle valves N1 and N2, the compensator COMP, the piloted directional valve PD1 and PD2, the pressure relief valves R1 and R2, and the counter balance valves CB1 and CB2 may be implemented in a single valve thus providing a compact structure for controlling the hydraulics of the bin sweep 100.

Although it should be readily apparent to one skilled in the art, the various flows M1, M2, M3, M4, M5, M6, M7, and M8 may be flowed through structural members such as tubes, pipes, and/or hoses, or a combination thereof.

Example embodiments provide a novel bin sweep 100. One significant advantage of the bin sweep 100 is that the system may be implemented mechanically without any electrical switches or valves. As outlined above, the piloted directional valve PD1 allows the drives 5100 and 6100 to stop in the event the hydraulic pressure exceeds PD1's set pressure and the second piloted directional valve PD2 allows for the drives 5100 and 6100 to reverse themselves. The counter balance valves CB1 and CB2 route the return flow from the drive motors to tank. Both the forward and return flows are protected by adjustable relief valves.

In example embodiments, a hydraulic power unit may be remotely located outside of a bin to which the bin sweep 100 is installed. In example embodiments, the hydraulic power unit may provide a load sensing control. This may be controlled by a proportional valve and a programmable microprocessor. The programmable microprocessor may receive a signal from a bin level indicator indicating that the grain output is excessive. The programmable microprosessor may send a reduced PWM output to the control valve that in turn reduces the flow to the valve thus reducing an output of grain. This is a closed loop system that will allow for the augers to supply a regulated amount of grain to the discharge conveyor. This is an extremely efficient system that will save time and money.

Example embodiments, however, is not strictly limited by the above control devices. For example, rather than providing hydraulic motors, the motors 2390 of the first and second driving mechanisms 5000 and 6000 may be electric motors which may be controlled by a computer connected to pressure devices. Pressure sensors may be incorporated into the arms 2000 and 3000. The pressure sensors may be configured to send electronic signals to the computer which may utilize an algorithm to control the electric motors of the first and second driving mechanisms. For example, if the detected pressure is in a first range, the computer may send a signal to the motors of the first and second driving mechanisms to move in a first and second direction and may stop the motors in the event the detected pressure is in a third range. The computer may be further configured to reverse a direction of the first and second driving mechanisms 5000 and 6000 in the event the detected pressure is in a third range.

In example embodiments, ends of the first arm 2000 and the second arm 3000 may include sweep end connection assemblies. For example, as shown on FIG. 3, the first arm 2000 may include a first end connection assembly 2600 and the second arm 3000 may include a second end connection assembly 3600. In example embodiments, the first and second end connection assemblies 2600 and 3600 may be substantially identical, thus, only a description of the first end connection assembly 2600 will be provided for the sake of brevity.

Figure 30:
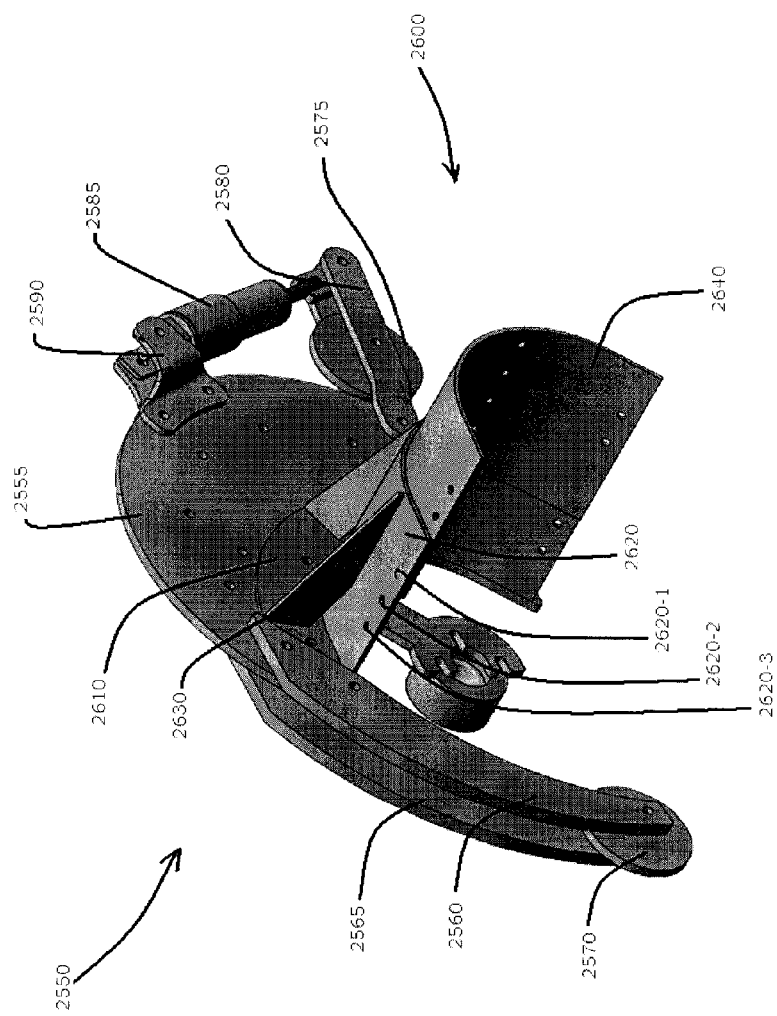
FIG. 30 is a view of an end connection assembly in accordance with example embodiments.

Referring to FIG. 30, the first end connection assembly 2600 may be connected to the fifth section 2500 via a fifth connection assembly 2550. In example embodiments the fifth connection assembly 2550 may be substantially similar to the first connection assembly 2150 which was previously described. For example, the fifth connection assembly may include a first wheel 2570, a second wheel 2575, sweep connection plates 2560 and 2565, a pair of linkages 2580, a biasing member 2585, a bracket 2590, and a connection plate 2555 similar to the first wheel 2170, the second wheel 2175, the sweep connection plates 2160 and 2165, the pair of linkages 2180, the biasing member 2185, the bracket 2190, and the connection plate 2155 of the first connection assembly 2150.

In example embodiments, the first end connection assembly 2600 may be comprised of a mating member 2610, a first extension member 2620, and a second extension member 2640. In example embodiments, the mating member 2610 may resemble an arc-shaped plate which a plurality of holes which may be used to bolt the mating member 2610 to the connection plate 2555 of the fifth connection assembly 2550. Example embodiments, however, are not limited thereto as the mating member 2610 may be secured to the connection plate 2555 by another method such as welding, riveting, clipping, and/or pinning. In addition, the first mating member 2610 is not required to be an arc-shaped plate. For example, the first mating member 2610 may be a plate having a polygonal shape. In addition, the first mating member 2610 is not required to be a plate, for example, the first mating member 2610 may be a tubular member.

As shown in FIG. 30, the first extension member 2620 may extend from the mating member 2610. For example, the first extension member 2620 and the connection plate 2555 may be substantially perpendicular to one another. In example embodiments, the first extension member 2620 may be a substantially curved member, for example, a curved plate. For example, the first extension member 2620 may have a substantially arc-shaped, semi-circular, or semi-elliptical cross-section. Example embodiments, however are not limited thereto. For example, the first extension member 2620 may have a polygonal cross-section.

In example embodiments, the second extension member 2640 may interface with the first extension member 2620. For example, as shown in FIG. 30, an outside surface of the second extension member 2640 may be configured to bear up against an inside surface of the first extension member 2620. Thus, an outside profile of the second extension member 2640 may at least partially match an inside profile of the first extension member 2620.

In example embodiments, the first extension member 2620 may include a plurality of holes 2620-1, 2620-2, and 2620-3. Though not shown in the FIG. 29, the second extension member 2640 may include a corresponding plurality of holes to allow the first extension member 2620 to be connected to the second extension member 2640 via a plurality of bolts. A particular advantage of the present example is that the position of the second extension plate 2640 may be bolted to the first extension plate 2620 in more than one location thus allowing for flexibility in an overall length of the first end connection assembly 2600.

In example embodiments, the first extension member 2620 may be attached to the mating member 2610. For example, the first extension member 2620 and the mating member 2610 may be welded to one another. In example embodiments, a plurality of ribs 2630 may also be provided between the first extension member 2620 and the mating member 2610. The plurality of ribs 2630 may resemble plates which reinforce the end connection assembly 2600.

Figure 31A:
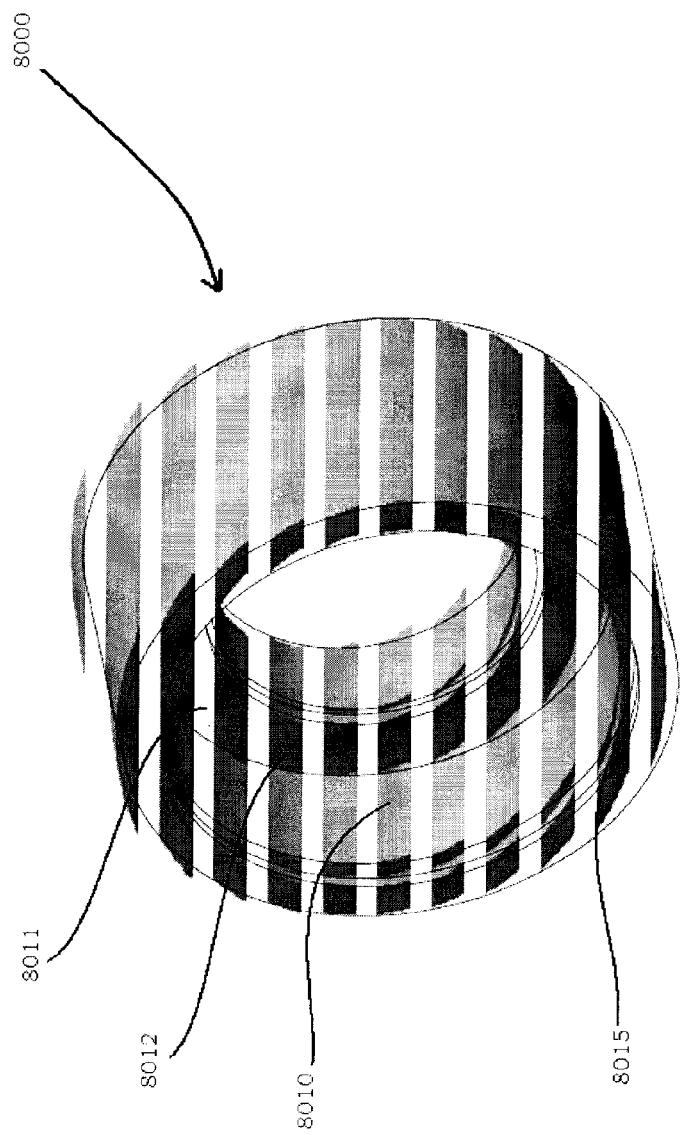
FIGS. 31A, 31B, 31C, and 31D illustrate a bearing housing in accordance with example embodiments.
Figure 31B:
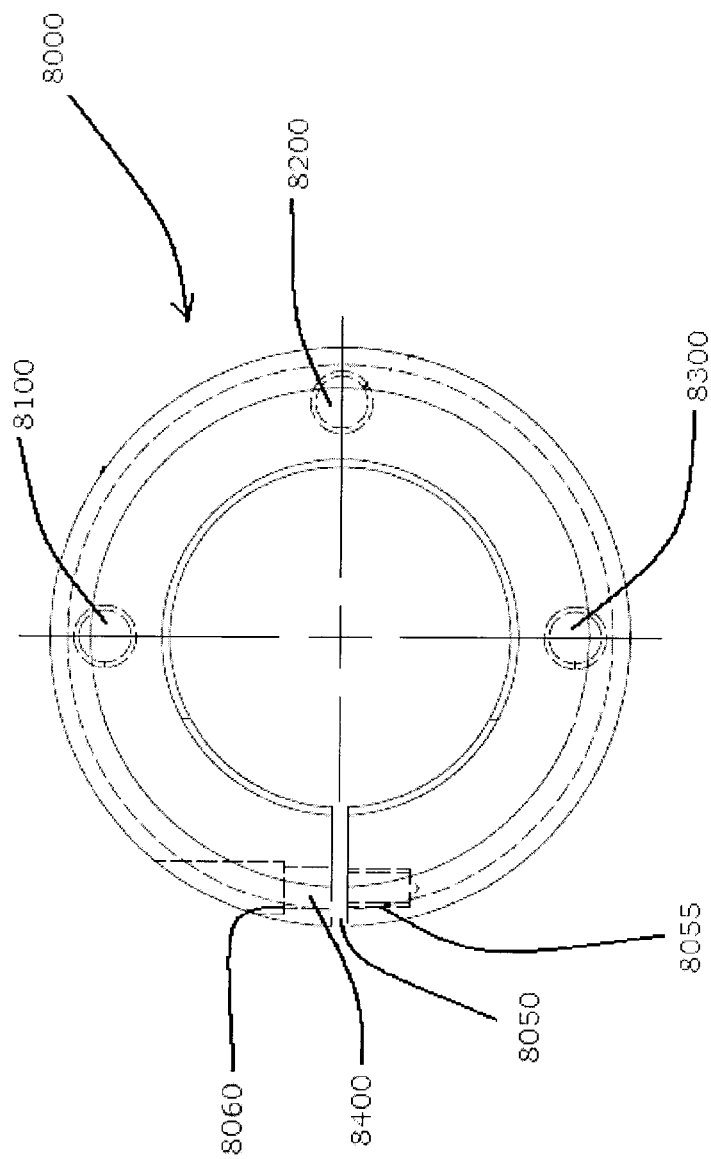

FIGS. 31A and 31B represent a novel bearing housing 8000 in accordance with example embodiments. The bearing housing 8000 may be substantially the same as the bearing houses 2197 and 2378 previously described and may be used in lieu of the previously described bearing houses 2197 and 2378. Referring to FIG. 31A, the bearing housing 8000 by be a substantially cylindrical structure having a space 8010 into which a bearing, for example, an auger bearing, may fit. The bearing housing 8000 may also include a substantially annular section 8011 which includes a wall 8012 on which the bearing may be pressed.

In example embodiments, the annular section 8011 may include a plurality of holes which may be used to connect the bearing housing 8000 to a structure. For example, as shown in FIG. 31B, the annular section 8011 may include a first hole 8100, a second hole 8200, and a third hole 8300 that may be used to attach the bearing housing 8000 to a structure. In example embodiments each of the first hole 8100, the second hole 8200, and the third hole 8300 may be internally threaded and therefore may be configured to receive externally threaded members such as screws. Although FIG. 31B illustrates the bearing housing 8000 as including three holes, example embodiments are not limited thereto as there may be more or less than three holes.

Figure 31C:
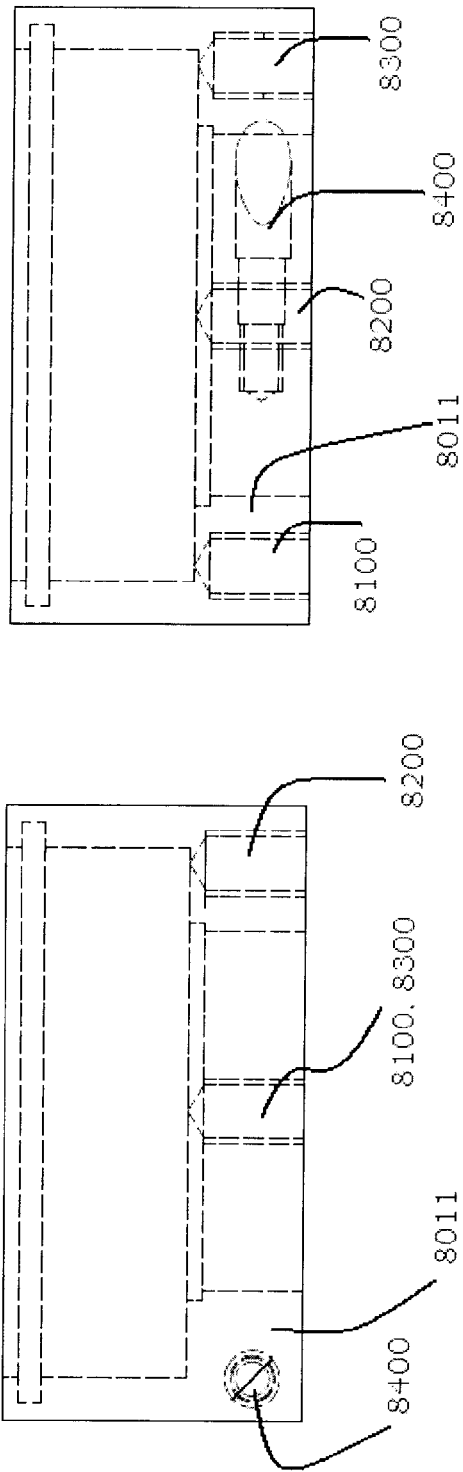

In example embodiments, the annular section 8011 may include a gap 8050 formed at one side thereof. The gap 8050, for example, may be relatively small. For example, the gap 8050 may be about ¹⁄₁₆". Although the gap 8050 is described as being about ¹⁄₁₆", example embodiments are not limited thereto as the gap 8050 may be greater than or less than ¹⁄₁₆". In example embodiments, a fourth hole 8400 may be formed in the bearing housing 8000. The fourth hole 8400 may include internal threads 8055 below the gap 8050 wherein the internal threads 8055 are configured to engage threads of a threaded structure, such as a screw. In example embodiments, a shoulder 8060 may also be provided in the fourth hole 8400 to provide a bearing surface for the threaded member to bear up against. For example, threaded member may be a screw and the shoulder may provide a surface to which a screw head may bear against. A top and side view of the bearing housing 8000 are provided in FIG. 31C for clarity.

Figure 31D:
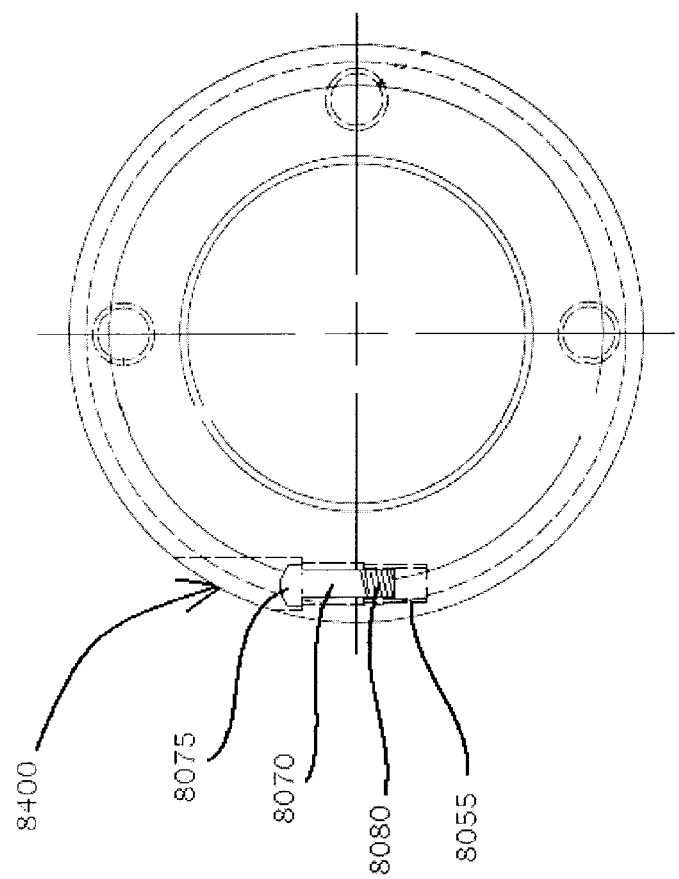

In example embodiments, a bearing may be inserted into the bearing housing 8000, and in particular, the space 8010 of the bearing housing 8000. The bearing may be secured in place by inserting a threaded member into the fourth hole 8400 so that the threads of the threaded member engage the internal threads 8055 of the fourth hole 8400. For example, as shown in FIG. 31D, a screw 8070 (an example of a threaded member) is inserted into the fourth hole 8400. As shown in FIG. 31D, external threads 8080 of the screw 8070 may engage the internal threads 8055 of the fourth hole 8400 and a head 8075 of the screw 8070 may bear up against the shoulder 8060 in the fourth hole 8400 so that as the screw 8070 is turned (tightened), the gap 8400 closes.

In example embodiments, additional structures may be provided to ensure the bearing is secured in the bearing housing 8000. For example, the bearing housing may include a groove 8015 into which a C-clip may be inserted to further secure the bearing in the bearing housing 8000.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What we claim is:

1. A sweep comprising:
   a pivot assembly;
   a first arm extending from the pivot assembly, the first arm including a first auger;
   a second arm extending from the pivot assembly, the second arm including a second auger;
   a first mobile driving mechanism attached to the first arm;
   a second mobile driving mechanism attached to the second arm; and
   a control device configured to control the first mobile driving mechanism and the second mobile driving mechanism, wherein the control device is configured to control the first mobile driving mechanism to travel in a first direction when a variable is in a first range and to stop when the variable is in a second range, the control device being further configured to control the second mobile driving mechanism to travel in a second direction when the variable is in the first range and stop when the variable is in the second range.

2. The sweep according to claim 1, wherein the control device is a computer and the variable is pressure.

3. The sweep according to claim 1, wherein the control device is a valve and the variable is pressure.

4. The sweep according to claim 3, wherein the valve is configured to flow a fluid to the first and second mobile driving mechanisms and the first and second mobile driving mechanisms are serially connected to each other with respect to a flow of the fluid.

5. The sweep according to claim 4, wherein the first mobile driving mechanism includes a first motor and the second mobile driving mechanism includes a second motor.

6. The sweep according to claim 5, wherein the first and second motors are hydraulic motors.

7. The sweep according to claim 6, wherein the fluid is a hydraulic fluid.

8. The sweep according to claim 1, wherein the control device is further configured to control the first mobile driving mechanism to travel in a third direction when the variable is in a third range and control the second mobile driving mechanism to travel in a fourth direction when the variable is in the third range.

9. The sweep according to claim 1, further comprising:
   a track substantially surrounding the pivot assembly.

10. The sweep according to claim 9, wherein the track has a substantially T-shaped cross-section.

11. The sweep according to claim 9, wherein the track is comprised of a substantially curved vertical plate and a substantially curved horizontal plate which are connected to one another by a plurality of connecting blocks, the substantially curved vertical plate including a plurality of holes configured to engage teeth of a gear of the first and second mobile driving mechanisms.

12. The sweep according to claim 1, wherein the
   pivot assembly includes a first motor connected to the first auger and a second motor connected to the second auger,
   the first mobile driving mechanism includes a third motor,
   the second mobile driving mechanism includes a fourth motor, and
   the control device is configured to control fluid to each of the first, second, third, and fourth motors.

13. The sweep according to claim 1, wherein the pivot assembly is configured to allow the first arm and the second arm to move independently of one another over a range.

14. The sweep according to claim 13, wherein the pivot assembly includes a swivel about which the first arm and the second arm revolve.

15. The sweep according to claim 13, wherein the pivot assembly includes structures which determine the range.

16. The sweep according to claim 15, wherein the structures are metal plates which attach to a collar that connects the second arm to the pivot assembly.

17. The sweep according to claim 1, wherein the control device is further configured to control a speed of the first and second mobile driving mechanisms.

18. The sweep according to claim 1, further comprising:
   a pump configured to provide fluid to the control device.

19. The sweep according to claim 18, further comprising:
   a material sensing device to detect an amount of material being moved by the sweep.

20. The sweep according to claim 19, wherein the sweep is configured to reduce a fluid flowing from the pump in the event the material sensing device senses an amount of material removed by the bin sweep exceeds a value.

* * * * *